US011869324B2

(12) United States Patent
Sommer et al.

(10) Patent No.: US 11,869,324 B2
(45) Date of Patent: Jan. 9, 2024

(54) SECURING A SECURITY TAG INTO AN ARTICLE

(71) Applicant: Sensormatic Electronics, LLC, Boca Raton, FL (US)

(72) Inventors: Olivier Bruno Sommer, Knoxville, TN (US); Lauri Johannes Huhtasalo, Tampere (FI)

(73) Assignee: Sensormatic Electronics, LLC, Boca Raton, FL (US)

( * ) Notice: Subject to any disclaimer, the term of this patent is extended or adjusted under 35 U.S.C. 154(b) by 83 days.

(21) Appl. No.: 17/645,844

(22) Filed: Dec. 23, 2021

(65) Prior Publication Data

US 2023/0206739 A1 Jun. 29, 2023

(51) Int. Cl.
*G08B 13/24* (2006.01)

(52) U.S. Cl.
CPC ..... *G08B 13/2445* (2013.01); *G08B 13/2417* (2013.01); *G08B 13/2434* (2013.01)

(58) Field of Classification Search
CPC .................................................. G08B 13/2445
See application file for complete search history.

(56) References Cited

U.S. PATENT DOCUMENTS 5,963,144 A 10/1999 Kruest
6,091,333 A * 7/2000 Oshima ............. G08B 13/2408 340/568.1
6,147,655 A 11/2000 Roesner
6,152,348 A 11/2000 Finn et al.
6,229,443 B1 5/2001 Roesner
6,265,976 B1 7/2001 Roesner
6,646,336 B1 11/2003 Marmaropoulos et al.
6,690,264 B2 2/2004 Dalglish
6,967,579 B1 11/2005 Elizondo
6,982,190 B2 1/2006 Roesner
7,026,935 B2 4/2006 Diorio et al.
7,026,936 B2 4/2006 Roesner
7,030,786 B2 4/2006 Kaplan et al.
7,038,544 B2 5/2006 Diorio et al.
7,038,573 B2 5/2006 Bann
7,038,603 B2 5/2006 Diorio et al.
(Continued)

FOREIGN PATENT DOCUMENTS

CN 101523605 A 9/2009
CN 101711430 A 5/2010
(Continued)

OTHER PUBLICATIONS

International Search Report and Written Opinion issued in International Patent Application No. PCT/US2022/081964 dated Apr. 21, 2023.

*Primary Examiner* — Travis R Hunnings
(74) *Attorney, Agent, or Firm* — ArentFox Schiff LLP

(57) ABSTRACT

A method for securing a security tag into an article of clothing includes positioning an end of the security tag into a first opening to an interface space between two layers of the article of clothing. The two layers are fixedly connected by one or more opposing connectors that are spaced apart in a manner to form the interface space sized to receive the security tag. The security tag is fully moved into the interface space. Also described herein is a security tag specially configured for placement into the interface space between two layers of the article of clothing.

30 Claims, 13 Drawing Sheets

(56) References Cited

U.S. PATENT DOCUMENTS

| | | | |
|---|---|---|---|
| 7,049,964 | B2 | 5/2006 | Hyde et al. |
| 7,054,595 | B2 | 5/2006 | Bann |
| 7,061,324 | B2 | 6/2006 | Diorio et al. |
| 7,064,653 | B2 | 6/2006 | Dalglish |
| 7,107,022 | B1 | 9/2006 | Thomas et al. |
| 7,116,240 | B2 | 10/2006 | Hyde |
| 7,119,664 | B2 | 10/2006 | Roesner |
| 7,120,550 | B2 | 10/2006 | Diorio et al. |
| 7,123,171 | B2 | 10/2006 | Kaplan et al. |
| 7,154,283 | B1 | 12/2006 | Weakley et al. |
| 7,158,408 | B2 | 1/2007 | Roesner et al. |
| 7,183,926 | B2 | 2/2007 | Diorio et al. |
| 7,187,237 | B1 | 3/2007 | Diorio et al. |
| 7,187,290 | B2 | 3/2007 | Hyde et al. |
| 7,199,456 | B2 | 4/2007 | Krappe et al. |
| 7,199,663 | B2 | 4/2007 | Diorio et al. |
| 7,212,446 | B2 | 5/2007 | Diorio et al. |
| 7,215,251 | B2 | 5/2007 | Hyde |
| D543,976 | S | 6/2007 | Oliver |
| D546,819 | S | 7/2007 | Oliver |
| D546,820 | S | 7/2007 | Oliver |
| D546,821 | S | 7/2007 | Oliver |
| D546,822 | S | 7/2007 | Oliver |
| D547,306 | S | 7/2007 | Oliver |
| D547,754 | S | 7/2007 | Oliver |
| 7,245,213 | B1 | 7/2007 | Esterberg et al. |
| 7,246,751 | B2 | 7/2007 | Diorio et al. |
| 7,247,214 | B2 | 7/2007 | Chamandy et al. |
| D548,225 | S | 8/2007 | Oliver |
| 7,253,719 | B2 | 8/2007 | Diorio et al. |
| 7,253,735 | B2 | 8/2007 | Gengel et al. |
| 7,283,037 | B2 | 10/2007 | Diorio et al. |
| 7,304,579 | B2 | 12/2007 | Diorio et al. |
| 7,307,528 | B2 | 12/2007 | Glidden et al. |
| 7,307,529 | B2 | 12/2007 | Gutnik et al. |
| 7,307,534 | B2 | 12/2007 | Pesavento |
| 7,312,622 | B2 | 12/2007 | Hyde et al. |
| D562,810 | S | 2/2008 | Oliver |
| D563,397 | S | 3/2008 | Oliver |
| 7,375,626 | B2 | 5/2008 | Ening |
| 7,380,190 | B2 | 5/2008 | Hara et al. |
| D570,337 | S | 6/2008 | Oliver |
| 7,382,257 | B2 | 6/2008 | Thomas et al. |
| 7,388,468 | B2 | 6/2008 | Diorio et al. |
| 7,389,101 | B2 | 6/2008 | Diorio et al. |
| 7,391,329 | B2 | 6/2008 | Humes et al. |
| 7,394,324 | B2 | 7/2008 | Diorio et al. |
| 7,400,255 | B2 | 7/2008 | Horch |
| 7,405,659 | B1 | 7/2008 | Hyde |
| 7,405,660 | B2 | 7/2008 | Diorio et al. |
| D574,369 | S | 8/2008 | Oliver |
| D574,370 | S | 8/2008 | Oliver |
| 7,408,466 | B2 | 8/2008 | Diorio et al. |
| 7,417,548 | B2 | 8/2008 | Kavounas et al. |
| 7,419,096 | B2 | 9/2008 | Esterberg et al. |
| 7,420,469 | B1 | 9/2008 | Oliver |
| 7,423,539 | B2 | 9/2008 | Hyde et al. |
| D578,114 | S | 10/2008 | Oliver |
| 7,432,814 | B2 | 10/2008 | Dietrich et al. |
| 7,436,308 | B2 | 10/2008 | Sundstrom et al. |
| 7,448,547 | B2 | 11/2008 | Esterberg |
| 7,469,126 | B2 | 12/2008 | Miettinen et al. |
| 7,472,835 | B2 | 1/2009 | Diorio et al. |
| D586,336 | S | 2/2009 | Oliver |
| 7,489,248 | B2 | 2/2009 | Gengel et al. |
| 7,492,164 | B2 | 2/2009 | Hanhikorpi et al. |
| D587,691 | S | 3/2009 | Oliver |
| 7,501,953 | B2 | 3/2009 | Diorio et al. |
| 7,510,117 | B2 | 3/2009 | Esterberg |
| 7,518,516 | B2 | 4/2009 | Azevedo et al. |
| 7,525,438 | B2 | 4/2009 | Hyde et al. |
| D592,192 | S | 5/2009 | Oliver |
| 7,528,724 | B2 | 5/2009 | Horch |
| 7,528,728 | B2 | 5/2009 | Oliver et al. |
| 7,541,843 | B1 | 6/2009 | Hyde et al. |
| 7,561,866 | B2 | 7/2009 | Oliver et al. |
| 7,589,618 | B2 | 9/2009 | Diorio et al. |
| 7,592,897 | B2 | 9/2009 | Diorio et al. |
| D605,641 | S | 12/2009 | Oliver |
| D606,056 | S | 12/2009 | Oliver |
| D606,057 | S | 12/2009 | Oliver |
| 7,633,376 | B2 | 12/2009 | Diorio et al. |
| 7,651,882 | B1 | 1/2010 | Bockorick et al. |
| D610,576 | S | 2/2010 | Oliver |
| 7,667,231 | B2 | 2/2010 | Hyde et al. |
| 7,667,589 | B2 | 2/2010 | Desmons et al. |
| D611,037 | S | 3/2010 | Oliver |
| 7,679,957 | B2 | 3/2010 | Ma et al. |
| D613,276 | S | 4/2010 | Oliver |
| 7,696,882 | B1 | 4/2010 | Rahimi et al. |
| 7,696,947 | B2 | 4/2010 | Gallschuetz et al. |
| 7,714,593 | B2 | 5/2010 | Varpula et al. |
| 7,715,236 | B2 | 5/2010 | Hyde |
| 7,719,406 | B2 | 5/2010 | Bajahr |
| D617,320 | S | 6/2010 | Oliver |
| 7,733,227 | B1 | 6/2010 | Pesavento et al. |
| D620,484 | S | 7/2010 | Oliver |
| D620,928 | S | 8/2010 | Oliver |
| 7,768,248 | B1 | 8/2010 | Hyde |
| 7,768,406 | B1 | 8/2010 | Peach et al. |
| 7,787,837 | B2 | 8/2010 | Mikuteit |
| 7,804,411 | B2 | 9/2010 | Copeland |
| 7,808,387 | B1 | 10/2010 | Kuhn |
| 7,808,823 | B2 | 10/2010 | Ma et al. |
| 7,812,729 | B2 | 10/2010 | Copeland |
| 7,830,262 | B1 | 11/2010 | Diorio et al. |
| 7,830,322 | B1 | 11/2010 | Oliver et al. |
| 7,843,399 | B2 | 11/2010 | Stobbe |
| 7,872,582 | B1 | 1/2011 | Diorio |
| 7,884,725 | B2 | 2/2011 | Kruest et al. |
| 7,907,899 | B1 | 3/2011 | Oliver |
| 7,917,088 | B2 | 3/2011 | Hyde et al. |
| 7,920,046 | B1 | 4/2011 | Aiouaz et al. |
| 7,969,364 | B2 | 6/2011 | Kriebel et al. |
| 7,973,643 | B2 | 7/2011 | Hyde et al. |
| 7,973,645 | B1 | 7/2011 | Moretti et al. |
| 7,973,661 | B2 | 7/2011 | Copeland |
| 7,975,414 | B2 | 7/2011 | Ritamäki et al. |
| 7,978,005 | B1 | 7/2011 | Hyde et al. |
| 7,982,611 | B1 | 7/2011 | Picasso et al. |
| 7,990,249 | B1 | 8/2011 | Hyde et al. |
| 7,994,897 | B2 | 8/2011 | Azevedo et al. |
| 7,999,675 | B2 | 8/2011 | Diorio et al. |
| 3,044,774 | A1 | 10/2011 | Diorio |
| 8,028,923 | B2 | 10/2011 | Shafran et al. |
| 8,044,801 | B1 | 10/2011 | Hyde et al. |
| 8,056,814 | B2 | 11/2011 | Martin et al. |
| 8,063,740 | B1 | 11/2011 | Diorio et al. |
| 8,072,327 | B2 | 12/2011 | Enyedy et al. |
| 8,072,329 | B1 | 12/2011 | Srinivas et al. |
| 8,072,332 | B2 | 12/2011 | Forster |
| 8,077,013 | B2 | 12/2011 | Cooper |
| 8,082,556 | B1 | 12/2011 | Aiouaz et al. |
| 8,093,617 | B2 | 1/2012 | Vicard et al. |
| 8,093,996 | B2 | 1/2012 | Heurtier |
| 8,098,134 | B2 | 1/2012 | Azevedo et al. |
| 8,115,590 | B1 | 2/2012 | Diorio et al. |
| 8,115,597 | B1 | 2/2012 | Oliver et al. |
| 8,115,632 | B1 | 2/2012 | Rahimi et al. |
| 8,120,494 | B1 | 2/2012 | Aiouaz et al. |
| 8,134,451 | B1 | 3/2012 | Diorio |
| 8,154,385 | B2 | 4/2012 | Aiouaz et al. |
| 8,174,367 | B1 | 5/2012 | Diorio |
| 8,179,265 | B2 | 5/2012 | Elizondo et al. |
| 8,188,867 | B2 | 5/2012 | Rietzler |
| 8,188,927 | B1 | 5/2012 | Koepp et al. |
| 8,193,912 | B1 | 6/2012 | Gutnik et al. |
| 8,201,748 | B2 | 6/2012 | Koepp et al. |
| 8,224,610 | B2 | 7/2012 | Diorio et al. |
| 8,228,175 | B1 | 7/2012 | Diorio et al. |
| 8,237,562 | B1 | 8/2012 | Picasso et al. |
| 8,244,201 | B2 | 8/2012 | Oliver et al. |
| 8,258,918 | B1 | 9/2012 | Diorio et al. |
| 8,258,955 | B1 | 9/2012 | Hyde et al. |

(56) References Cited

U.S. PATENT DOCUMENTS 8,260,241 B1 9/2012 Hyde
8,279,045 B2 10/2012 Diorio et al.
8,294,582 B1 10/2012 Humes et al.
8,303,389 B2 11/2012 Wilm
8,305,764 B2 11/2012 Rietzler
8,325,014 B1 12/2012 Sundstrom et al.
8,325,042 B1 12/2012 Hyde et al.
8,326,256 B1 12/2012 Kuhn
8,334,751 B2 12/2012 Azevedo et al.
8,342,402 B2 1/2013 Kriebel et al.
8,344,857 B1 1/2013 Oliver et al.
8,350,665 B1 1/2013 Sundstrom et al.
8,350,702 B2 1/2013 Copeland et al.
8,354,917 B2 1/2013 Diorio et al.
8,390,425 B1 3/2013 Cooper et al.
8,390,430 B1 3/2013 Sundstrom et al.
8,390,431 B1 3/2013 Diorio
8,391,785 B2 3/2013 Hyde et al.
8,427,315 B2 4/2013 Aiouaz et al.
8,428,515 B1 4/2013 Oliver
8,446,258 B2 5/2013 Diorio et al.
8,448,874 B2 5/2013 Koskelainen
8,451,095 B2 5/2013 Azevedo et al.
8,451,119 B1 5/2013 Rahimi et al.
8,451,673 B1 5/2013 Pesavento et al.
8,471,708 B1 6/2013 Diorio et al.
8,471,773 B2 6/2013 Vicard et al.
8,511,569 B1 8/2013 Koepp et al.
8,536,075 B2 9/2013 Leonard
8,570,157 B1 10/2013 Diorio et al.
8,587,411 B1 11/2013 Diorio
8,593,257 B1 11/2013 Diorio et al.
D695,278 S 12/2013 Koskelainen
8,600,298 B1 12/2013 Hyde et al.
8,610,580 B2 12/2013 Elizondo et al.
8,614,506 B1 12/2013 Fassett et al.
8,616,459 B2 12/2013 Sykko et al.
8,661,652 B1 3/2014 Koepp et al.
8,665,074 B1 3/2014 Diorio et al.
8,669,872 B1 3/2014 Stanford et al.
8,669,874 B2 3/2014 Kruest et al.
8,680,973 B2 3/2014 Kruest et al.
8,698,629 B1 4/2014 Stanford et al.
8,717,145 B2 5/2014 Ho et al.
D710,337 S 8/2014 Koskelainen
8,796,865 B1 8/2014 Fassett et al.
8,810,376 B1 8/2014 Picasso et al.
8,814,054 B2 8/2014 Brun et al.
8,816,909 B2 8/2014 Jiang et al.
8,830,038 B1 9/2014 Stanford et al.
8,830,064 B1 9/2014 Stanford et al.
8,830,065 B1 9/2014 Stanford et al.
8,866,594 B1 10/2014 Diorio et al.
8,866,595 B1 10/2014 Diorio et al.
8,866,596 B1 10/2014 Diorio et al.
8,872,636 B1 10/2014 Diorio et al.
8,881,373 B1 11/2014 Koepp et al.
8,902,627 B1 12/2014 Pesavento et al.
8,907,795 B2 12/2014 Soto et al.
8,917,179 B2 12/2014 Alicot et al.
8,917,219 B2 12/2014 Semar et al.
8,952,792 B1 2/2015 Srinivas et al.
8,967,486 B2 3/2015 Chandramowle et al.
8,988,199 B1 3/2015 Moretti et al.
8,991,714 B2 3/2015 Elizondo et al.
8,998,097 B2 4/2015 Launiainen
9,000,835 B1 4/2015 Peach et al.
D729,780 S 5/2015 Koskelainen et al.
9,024,729 B1 5/2015 Diorio et al.
9,024,731 B1 5/2015 Diorio et al.
9,031,504 B1 5/2015 Hyde et al.
9,035,748 B2 5/2015 Greefkes
9,053,400 B2 6/2015 Diorio et al.
9,058,554 B2 6/2015 Kervinen et al.
9,064,196 B1 6/2015 Gutnik et al.
9,064,199 B2 6/2015 Nitta
9,070,066 B1 6/2015 Oliver et al.
9,076,049 B1 7/2015 Moretti et al.
9,087,281 B2 7/2015 Maguire et al.
9,087,282 B1 7/2015 Hyde et al.
9,104,923 B1 8/2015 Stanford et al.
9,111,283 B1 8/2015 Diorio et al.
9,129,168 B1 9/2015 Diorio et al.
9,129,169 B1 9/2015 Diorio et al.
9,135,476 B2 9/2015 Virtanen
9,142,881 B1 9/2015 Oliver et al.
9,165,170 B1 10/2015 Gutnik et al.
9,178,277 B1 11/2015 Moretti et al.
9,183,717 B1 11/2015 Diorio et al.
9,189,904 B1 11/2015 Diorio et al.
9,197,294 B2 11/2015 Alicot et al.
9,202,093 B2 12/2015 Nummila et al.
9,213,870 B1 12/2015 Diorio et al.
9,213,871 B1 12/2015 Diorio et al.
9,215,809 B2 12/2015 Nieland et al.
9,239,941 B1 1/2016 Diorio
9,247,634 B2 1/2016 Kruest et al.
9,253,876 B2 2/2016 Elizondo et al.
9,281,552 B2 3/2016 Virtanen
9,299,586 B1 3/2016 West et al.
9,305,195 B1 4/2016 Diorio et al.
9,317,799 B1 4/2016 Koepp et al.
9,325,053 B2 4/2016 Virtanen et al.
9,330,284 B1 5/2016 Diorio
9,342,775 B2 5/2016 Forster
9,349,032 B1 5/2016 Diorio et al.
9,349,090 B1 5/2016 Srinivas et al.
9,373,012 B2 6/2016 Pesavento et al.
9,390,603 B2 7/2016 Li et al.
9,405,945 B1 8/2016 Diorio et al.
9,430,683 B1 8/2016 Hyde
9,454,680 B1 9/2016 Diorio
9,460,380 B1 10/2016 Koepp et al.
9,471,816 B1 10/2016 Hyde et al.
9,489,611 B1 11/2016 Diorio et al.
9,495,631 B1 11/2016 Koepp et al.
9,501,675 B1 11/2016 Diorio et al.
9,501,736 B2 11/2016 Elizondo et al.
9,503,160 B1 11/2016 Hyde
9,542,636 B2 1/2017 Buehler
9,565,022 B1 2/2017 Robshaw et al.
9,582,690 B2 2/2017 Rietzler
9,589,224 B2 3/2017 Patterson et al.
9,607,191 B1 3/2017 Peach et al.
9,607,286 B1 3/2017 Diorio
9,626,619 B2 4/2017 Kruest et al.
9,633,302 B1 4/2017 Heinrich
9,646,186 B1 5/2017 Hyde et al.
9,652,643 B1 5/2017 Pesavento et al.
9,690,949 B1 6/2017 Diorio et al.
9,691,243 B1 6/2017 Diorio et al.
9,697,387 B1 7/2017 Bowman et al.
9,715,605 B1 7/2017 Sundstrom et al.
9,740,891 B1 8/2017 Robshaw et al.
9,747,542 B2 8/2017 Elizondo et al.
9,767,333 B1 9/2017 Diorio et al.
9,773,133 B2 9/2017 Oliver et al.
9,773,201 B2 9/2017 Shafran et al.
9,779,599 B2 10/2017 Sharpy et al.
9,792,472 B1 10/2017 Robshaw et al.
9,792,543 B2 10/2017 Kuschewski et al.
9,805,223 B1 10/2017 Bowman et al.
9,805,235 B2 10/2017 Kruest et al.
9,818,084 B1 11/2017 Diorio et al.
9,831,724 B2 11/2017 Copeland et al.
9,846,794 B2 12/2017 Greefkes
9,846,833 B1 12/2017 Koepp et al.
9,852,319 B1 12/2017 Pesavento et al.
9,875,438 B1 1/2018 Diorio et al.
9,881,186 B1 1/2018 Sundstrom et al.
9,881,473 B1 1/2018 Diorio et al.
9,886,658 B1 2/2018 Stanford et al.
9,887,843 B1 2/2018 Robshaw et al.
9,911,017 B2 3/2018 Uhl et al.

(56) References Cited

U.S. PATENT DOCUMENTS

| | | | |
|---|---|---|---|
| 9,911,018 | B1 | 3/2018 | Heinrich et al. |
| 9,916,483 | B1 | 3/2018 | Robshaw et al. |
| 9,916,484 | B2 | 3/2018 | Pesavento et al. |
| 9,922,215 | B2 | 3/2018 | Huhtasalo et al. |
| 9,928,388 | B1 | 3/2018 | Bowman et al. |
| 9,928,390 | B1 | 3/2018 | Diorio et al. |
| 9,940,490 | B1 | 4/2018 | Robshaw et al. |
| 9,953,198 | B2 | 4/2018 | Kohler et al. |
| 9,954,278 | B1 | 4/2018 | Moretti et al. |
| 9,959,435 | B1 | 5/2018 | Diorio et al. |
| 9,959,494 | B1 | 5/2018 | Shyamkumar et al. |
| 9,977,932 | B2 | 5/2018 | Rietzler |
| 10,002,266 | B1 | 6/2018 | Hyde et al. |
| 10,013,587 | B1 | 7/2018 | Pesavento et al. |
| 10,037,444 | B1 | 7/2018 | Sundstrom et al. |
| 10,043,046 | B1 | 8/2018 | Robshaw et al. |
| 10,049,317 | B1 | 8/2018 | Diorio et al. |
| 10,061,950 | B1 | 8/2018 | Pesavento et al. |
| 10,068,167 | B2 | 9/2018 | Huhtasalo |
| 10,084,597 | B1 | 9/2018 | Robshaw et al. |
| 10,116,033 | B1 | 10/2018 | Koepp et al. |
| 10,121,033 | B1 | 11/2018 | Robshaw et al. |
| 10,133,894 | B2 | 11/2018 | Kruest et al. |
| 10,146,969 | B1 | 12/2018 | Diorio et al. |
| 10,169,625 | B1 | 1/2019 | Diorio et al. |
| 10,186,127 | B1 | 1/2019 | Diorio et al. |
| 10,204,245 | B1 | 2/2019 | Diorio et al. |
| 10,204,246 | B1 | 2/2019 | Maguire et al. |
| 10,235,545 | B2 | 3/2019 | Kruest et al. |
| 10,262,167 | B2 | 4/2019 | Nyalamadugu et al. |
| 10,311,351 | B1 | 6/2019 | Diorio et al. |
| 10,311,353 | B1 | 6/2019 | Diorio et al. |
| 10,325,125 | B1 | 6/2019 | Pesavento et al. |
| 10,331,993 | B1 | 6/2019 | Koepp et al. |
| 10,339,436 | B2 | 7/2019 | Huhtasalo |
| 10,373,038 | B1 | 8/2019 | Stanford |
| 10,373,115 | B1 | 8/2019 | Diorio et al. |
| 10,402,710 | B1 | 9/2019 | Diorio et al. |
| 10,417,085 | B1 | 9/2019 | Diorio |
| 10,417,464 | B2 | 9/2019 | Huhtasalo et al. |
| 10,430,623 | B1 | 10/2019 | Pesavento et al. |
| 10,445,535 | B1 | 10/2019 | Hyde et al. |
| D865,726 | S | 11/2019 | Oliver |
| 10,474,851 | B2 | 11/2019 | Greefkes |
| RE47,755 | E | 12/2019 | Hyde et al. |
| 10,521,768 | B1 | 12/2019 | Diorio et al. |
| 10,546,162 | B1 | 1/2020 | Diorio |
| 10,558,828 | B2 | 2/2020 | Martinez De Velasco Cortina et al. |
| 10,572,703 | B1 | 2/2020 | Shyamkumar et al. |
| 10,572,789 | B1 | 2/2020 | Stanford et al. |
| D879,077 | S | 3/2020 | Oliver |
| 10,600,298 | B1 | 3/2020 | Diorio et al. |
| 10,650,201 | B1 | 5/2020 | Maguire et al. |
| 10,650,202 | B1 | 5/2020 | Robshaw et al. |
| 10,650,346 | B1 | 5/2020 | Pesavento et al. |
| 10,664,670 | B1 | 5/2020 | Diorio et al. |
| D887,400 | S | 6/2020 | Oliver |
| 10,679,019 | B1 | 6/2020 | Thomas et al. |
| 10,679,115 | B2 | 6/2020 | Huhtasalo |
| 10,699,178 | B1 | 6/2020 | Diorio et al. |
| 10,713,453 | B1 | 7/2020 | Diorio et al. |
| 10,713,549 | B1 | 7/2020 | Peach et al. |
| 10,719,671 | B1 | 7/2020 | Robshaw et al. |
| 10,720,700 | B1 | 7/2020 | Moretti et al. |
| 10,733,395 | B1 | 8/2020 | Diorio et al. |
| 10,740,574 | B1 | 8/2020 | Stanford et al. |
| 10,776,198 | B1 | 9/2020 | Diorio |
| 10,783,424 | B1 | 9/2020 | Trivelpiece et al. |
| 10,790,160 | B2 | 9/2020 | Singleton et al. |
| 10,819,319 | B1 | 10/2020 | Hyde |
| 10,824,824 | B1 | 11/2020 | Diorio |
| 10,846,583 | B1 | 11/2020 | Koepp et al. |
| 10,860,819 | B1 | 12/2020 | Pesavento et al. |
| 10,878,371 | B1 | 12/2020 | Stanford et al. |
| 10,878,685 | B1 | 12/2020 | Diorio et al. |
| 10,885,417 | B1 | 1/2021 | Stanford et al. |
| 10,885,421 | B1 | 1/2021 | Diorio et al. |
| 10,902,308 | B2 | 1/2021 | Gire et al. |
| 10,916,114 | B1 | 2/2021 | Diorio et al. |
| 10,929,734 | B1 | 2/2021 | Hyde et al. |
| 10,936,929 | B1 | 3/2021 | Diorio et al. |
| 10,956,693 | B1 | 3/2021 | Shyamkumar et al. |
| 10,995,523 | B2 | 5/2021 | Claeys et al. |
| 11,017,187 | B1 | 5/2021 | Thomas et al. |
| 11,017,349 | B1 | 5/2021 | Diorio et al. |
| 11,024,936 | B1 | 6/2021 | Koepp et al. |
| 11,062,190 | B1 | 7/2021 | Diorio et al. |
| 11,107,034 | B1 | 8/2021 | Pesavento et al. |
| D929,975 | S | 9/2021 | Abdul Rahman |
| 11,120,320 | B1 | 9/2021 | Robshaw et al. |
| 11,132,589 | B2 | 9/2021 | Chandramowle et al. |
| 11,188,803 | B1 | 11/2021 | Patil et al. |
| 11,200,387 | B1 | 12/2021 | Stanford et al. |
| 11,232,340 | B1 | 1/2022 | Diorio et al. |
| 11,244,282 | B1 | 2/2022 | Diorio et al. |
| 11,259,443 | B1 | 2/2022 | Kunasekaran et al. |
| 11,282,357 | B2 | 3/2022 | Claeys et al. |
| 11,288,564 | B1 | 3/2022 | Koepp et al. |
| 11,300,467 | B2 | 4/2022 | Boellaard et al. |
| 11,321,547 | B1 | 5/2022 | Pesavento et al. |
| 11,341,343 | B1 | 5/2022 | Diorio |
| 11,341,837 | B1 | 5/2022 | Diorio et al. |
| 11,361,174 | B1 | 6/2022 | Robshaw et al. |
| 11,403,505 | B1 | 8/2022 | Diorio et al. |
| 11,423,278 | B1 | 8/2022 | Koepp et al. |
| 11,443,160 | B2 | 9/2022 | Trivelpiece et al. |
| 11,461,570 | B1 | 10/2022 | Shyamkumar et al. |
| 11,481,591 | B1 | 10/2022 | Peach et al. |
| 11,481,592 | B1 | 10/2022 | Diorio et al. |
| 11,514,254 | B1 | 11/2022 | Diorio |
| 11,514,255 | B1 | 11/2022 | Thomas et al. |
| 11,519,200 | B2 | 12/2022 | Claeys et al. |
| 2001/0034063 | A1 | 10/2001 | Saunders et al. |
| 2002/0088154 | A1 | 7/2002 | Sandt et al. |
| 2002/0097143 | A1 | 7/2002 | Dalglish |
| 2003/0136503 | A1 | 7/2003 | Green et al. |
| 2004/0026754 | A1 | 2/2004 | Liu et al. |
| 2004/0125040 | A1 | 7/2004 | Ferguson et al. |
| 2004/0192011 | A1 | 9/2004 | Roesner |
| 2004/0195593 | A1 | 10/2004 | Diorio et al. |
| 2004/0200061 | A1 | 10/2004 | Coleman et al. |
| 2005/0001785 | A1 | 1/2005 | Ferguson et al. |
| 2005/0052281 | A1 | 3/2005 | Bann |
| 2005/0054293 | A1 | 3/2005 | Bann |
| 2005/0057341 | A1 | 3/2005 | Roesner |
| 2005/0058292 | A1 | 3/2005 | Diorio et al. |
| 2005/0068179 | A1 | 3/2005 | Roesner |
| 2005/0068180 | A1 | 3/2005 | Miettinen et al. |
| 2005/0093690 | A1 | 5/2005 | Miglionico |
| 2005/0099269 | A1 | 5/2005 | Diorio et al. |
| 2005/0099270 | A1 | 5/2005 | Diorio et al. |
| 2005/0140448 | A1 | 6/2005 | Diorio et al. |
| 2005/0140449 | A1 | 6/2005 | Diorio et al. |
| 2005/0162233 | A1 | 7/2005 | Diorio et al. |
| 2005/0185460 | A1 | 8/2005 | Roesner et al. |
| 2005/0200402 | A1 | 9/2005 | Diorio et al. |
| 2005/0200415 | A1 | 9/2005 | Diorio et al. |
| 2005/0200416 | A1 | 9/2005 | Diorio et al. |
| 2005/0200417 | A1 | 9/2005 | Diorio et al. |
| 2005/0212674 | A1 | 9/2005 | Desmons et al. |
| 2005/0223286 | A1 | 10/2005 | Forster |
| 2005/0225433 | A1 | 10/2005 | Diorio et al. |
| 2005/0225434 | A1 | 10/2005 | Diorio et al. |
| 2005/0225435 | A1 | 10/2005 | Diorio et al. |
| 2005/0225436 | A1 | 10/2005 | Diorio et al. |
| 2005/0225447 | A1 | 10/2005 | Diorio et al. |
| 2005/0237157 | A1 | 10/2005 | Cooper et al. |
| 2005/0237158 | A1 | 10/2005 | Cooper et al. |
| 2005/0237159 | A1 | 10/2005 | Cooper et al. |
| 2005/0237162 | A1 | 10/2005 | Hyde et al. |
| 2005/0237843 | A1 | 10/2005 | Hyde |
| 2005/0237844 | A1 | 10/2005 | Hiyde |
| 2005/0240369 | A1 | 10/2005 | Diorio et al. |

(56) References Cited

U.S. PATENT DOCUMENTS

| | | | |
|---|---|---|---|
| 2005/0240370 | A1 | 10/2005 | Diorio et al. |
| 2005/0240739 | A1 | 10/2005 | Pesavento |
| 2005/0269408 | A1 | 12/2005 | Esterberg et al. |
| 2005/0270141 | A1 | 12/2005 | Dalglish |
| 2005/0270185 | A1 | 12/2005 | Esterberg |
| 2005/0270189 | A1 | 12/2005 | Kaplan et al. |
| 2005/0275533 | A1 | 12/2005 | Hanhikorpi et al. |
| 2005/0280505 | A1 | 12/2005 | Humes et al. |
| 2005/0280506 | A1 | 12/2005 | Lobanov et al. |
| 2005/0280507 | A1 | 12/2005 | Diorio et al. |
| 2005/0282495 | A1 | 12/2005 | Forster |
| 2006/0033622 | A1 | 2/2006 | Hyde et al. |
| 2006/0043198 | A1 | 3/2006 | Forster |
| 2006/0044769 | A1 | 3/2006 | Forster et al. |
| 2006/0049917 | A1 | 3/2006 | Hyde et al. |
| 2006/0049928 | A1 | 3/2006 | Ening |
| 2006/0055620 | A1 | 3/2006 | Oliver et al. |
| 2006/0063323 | A1 | 3/2006 | Munn |
| 2006/0071758 | A1 | 4/2006 | Cooper et al. |
| 2006/0071759 | A1 | 4/2006 | Cooper et al. |
| 2006/0071793 | A1 | 4/2006 | Pesavento |
| 2006/0071796 | A1 | 4/2006 | Korzeniewski |
| 2006/0082442 | A1 | 4/2006 | Sundstrom |
| 2006/0086810 | A1 | 4/2006 | Diorio et al. |
| 2006/0098765 | A1 | 5/2006 | Thomas et al. |
| 2006/0125505 | A1 | 6/2006 | Glidden et al. |
| 2006/0125506 | A1 | 6/2006 | Hara et al. |
| 2006/0125507 | A1 | 6/2006 | Hyde et al. |
| 2006/0125508 | A1 | 6/2006 | Glidden et al. |
| 2006/0125641 | A1 | 6/2006 | Forster |
| 2006/0133140 | A1 | 6/2006 | Gutnik et al. |
| 2006/0133175 | A1 | 6/2006 | Gutnik et al. |
| 2006/0145710 | A1 | 7/2006 | Puleston et al. |
| 2006/0145855 | A1 | 7/2006 | Diorio et al. |
| 2006/0145861 | A1 | 7/2006 | Forster et al. |
| 2006/0145864 | A1 | 7/2006 | Jacober et al. |
| 2006/0163370 | A1 | 7/2006 | Diorio et al. |
| 2006/0164214 | A1 | 7/2006 | Bajahr |
| 2006/0186960 | A1 | 8/2006 | Diorio et al. |
| 2006/0187031 | A1 | 8/2006 | Moretti et al. |
| 2006/0187094 | A1 | 8/2006 | Kaplan et al. |
| 2006/0197668 | A1 | 9/2006 | Oliver et al. |
| 2006/0199551 | A1 | 9/2006 | Thomas et al. |
| 2006/0202705 | A1 | 9/2006 | Forster |
| 2006/0202831 | A1 | 9/2006 | Horch |
| 2006/0206277 | A1 | 9/2006 | Horch |
| 2006/0211386 | A1 | 9/2006 | Thomas et al. |
| 2006/0220639 | A1 | 10/2006 | Hyde |
| 2006/0220865 | A1 | 10/2006 | Babine et al. |
| 2006/0221715 | A1 | 10/2006 | Ma et al. |
| 2006/0224647 | A1 | 10/2006 | Gutnik |
| 2006/0226982 | A1 | 10/2006 | Forster |
| 2006/0226983 | A1 | 10/2006 | Forster et al. |
| 2006/0236203 | A1 | 10/2006 | Diorio et al. |
| 2006/0238345 | A1 | 10/2006 | Ferguson et al. |
| 2006/0244598 | A1 | 11/2006 | Hyde et al. |
| 2006/0250245 | A1 | 11/2006 | Forster |
| 2006/0250246 | A1 | 11/2006 | Forster |
| 2006/0252182 | A1 | 11/2006 | Wang et al. |
| 2006/0261950 | A1* | 11/2006 | Arneson .......... G06K 19/07749 340/572.1 |
| 2006/0261952 | A1 | 11/2006 | Kavounas et al. |
| 2006/0261953 | A1 | 11/2006 | Diorio et al. |
| 2006/0261954 | A1 | 11/2006 | Dietrich et al. |
| 2006/0261955 | A1 | 11/2006 | Humes et al. |
| 2006/0261956 | A1 | 11/2006 | Sundstrom et al. |
| 2006/0271328 | A1 | 11/2006 | Forster |
| 2006/0273170 | A1 | 12/2006 | Forster et al. |
| 2007/0001856 | A1 | 1/2007 | Diorio et al. |
| 2007/0008238 | A1 | 1/2007 | Liu et al. |
| 2007/0024446 | A1 | 2/2007 | Hyde et al. |
| 2007/0035466 | A1 | 2/2007 | Coleman et al. |
| 2007/0039687 | A1 | 2/2007 | Hamilton et al. |
| 2007/0046432 | A1 | 3/2007 | Aiouaz et al. |
| 2007/0052613 | A1 | 3/2007 | Gallschuetz et al. |
| 2007/0060075 | A1 | 3/2007 | Mikuteit |
| 2007/0085685 | A1 | 4/2007 | Phaneuf et al. |
| 2007/0109129 | A1 | 5/2007 | Sundstrom et al. |
| 2007/0126584 | A1 | 6/2007 | Hyde et al. |
| 2007/0136583 | A1 | 6/2007 | Diorio et al. |
| 2007/0136584 | A1 | 6/2007 | Diorio et al. |
| 2007/0136585 | A1 | 6/2007 | Diorio et al. |
| 2007/0141760 | A1 | 6/2007 | Ferguson et al. |
| 2007/0144662 | A1 | 6/2007 | Armijo et al. |
| 2007/0152073 | A1 | 7/2007 | Esterberg |
| 2007/0156281 | A1 | 7/2007 | Eung et al. |
| 2007/0164851 | A1 | 7/2007 | Cooper |
| 2007/0171129 | A1 | 7/2007 | Coleman et al. |
| 2007/0172966 | A1 | 7/2007 | Hyde et al. |
| 2007/0177738 | A1 | 8/2007 | Diorio et al. |
| 2007/0180009 | A1 | 8/2007 | Gutnik |
| 2007/0216533 | A1 | 9/2007 | Hyde et al. |
| 2007/0218571 | A1 | 9/2007 | Stoughton et al. |
| 2007/0220737 | A1 | 9/2007 | Stoughton et al. |
| 2007/0221737 | A2 | 9/2007 | Diorio et al. |
| 2007/0236331 | A1 | 10/2007 | Thompson et al. |
| 2007/0236335 | A1 | 10/2007 | Aiouaz et al. |
| 2007/0241762 | A1 | 10/2007 | Varpula et al. |
| 2007/0296590 | A1 | 12/2007 | Diorio et al. |
| 2007/0296603 | A1 | 12/2007 | Diorio et al. |
| 2008/0006702 | A2 | 1/2008 | Diorio et al. |
| 2008/0018489 | A1 | 1/2008 | Kruest et al. |
| 2008/0024273 | A1 | 1/2008 | Kruest et al. |
| 2008/0030342 | A1 | 2/2008 | Elizondo et al. |
| 2008/0046492 | A1 | 2/2008 | Sundstrom |
| 2008/0048833 | A1 | 2/2008 | Oliver |
| 2008/0048867 | A1 | 2/2008 | Oliver et al. |
| 2008/0084275 | A1 | 4/2008 | Azevedo et al. |
| 2008/0094214 | A1 | 4/2008 | Azevedo et al. |
| 2008/0136602 | A1 | 6/2008 | Ma et al. |
| 2008/0180217 | A1 | 7/2008 | Isabell |
| 2008/0180255 | A1 | 7/2008 | Isabell |
| 2008/0197978 | A1 | 8/2008 | Diorio et al. |
| 2008/0197979 | A1 | 8/2008 | Enyedy et al. |
| 2008/0204195 | A1 | 8/2008 | Diorio et al. |
| 2008/0232883 | A1 | 9/2008 | Klein et al. |
| 2008/0232894 | A1 | 9/2008 | Neuhard |
| 2008/0258878 | A1 | 10/2008 | Dietrich et al. |
| 2008/0258916 | A1 | 10/2008 | Diorio et al. |
| 2008/0266098 | A1 | 10/2008 | Aiouaz et al. |
| 2008/0297421 | A1 | 12/2008 | Kriebel et al. |
| 2008/0314990 | A1 | 12/2008 | Rietzler |
| 2008/0315992 | A1 | 12/2008 | Forster |
| 2009/0002132 | A1 | 1/2009 | Diorio et al. |
| 2009/0015382 | A1 | 1/2009 | Greefkes |
| 2009/0027173 | A1 | 1/2009 | Forster |
| 2009/0033495 | A1 | 2/2009 | Abraham et al. |
| 2009/0038735 | A1 | 2/2009 | Kian |
| 2009/0091424 | A1 | 4/2009 | Rietzler |
| 2009/0123704 | A1 | 5/2009 | Shafran et al. |
| 2009/0146785 | A1 | 6/2009 | Forster |
| 2009/0184824 | A1 | 7/2009 | Forster |
| 2009/0189770 | A1 | 7/2009 | Wirrig et al. |
| 2009/0194588 | A1 | 8/2009 | Blanchard et al. |
| 2009/0200066 | A1 | 8/2009 | Vicard et al. |
| 2009/0212919 | A1 | 8/2009 | Selgrath et al. |
| 2009/0237220 | A1 | 9/2009 | Oliver et al. |
| 2009/0251293 | A1 | 10/2009 | Azevedo et al. |
| 2010/0032900 | A1 | 2/2010 | Wilm |
| 2010/0033297 | A1 | 2/2010 | Patovirta |
| 2010/0050487 | A1 | 3/2010 | Weightman et al. |
| 2010/0060456 | A1 | 3/2010 | Forster |
| 2010/0060459 | A1 | 3/2010 | Stole et al. |
| 2010/0079286 | A1 | 4/2010 | Phaneuf |
| 2010/0079287 | A1 | 4/2010 | Forster et al. |
| 2010/0079290 | A1 | 4/2010 | Phaneuf |
| 2010/0126000 | A1 | 5/2010 | Forster |
| 2010/0155492 | A1 | 6/2010 | Forster |
| 2010/0156640 | A1 | 6/2010 | Forster |
| 2010/0182129 | A1 | 7/2010 | Hyde et al. |
| 2010/0226107 | A1 | 9/2010 | Rietzler |
| 2010/0245182 | A1 | 9/2010 | Vicard et al. |
| 2010/0259392 | A1 | 10/2010 | Chamandy et al. |
| 2010/0270382 | A1 | 10/2010 | Koepp et al. |

(56) References Cited

U.S. PATENT DOCUMENTS

2011/0000970 A1 1/2011 Abraham
2011/0062236 A1 3/2011 Kriebel et al.
2011/0114734 A1 5/2011 Tiedmann et al.
2011/0121082 A1 5/2011 Phaneuf
2011/0121972 A1 5/2011 Phaneuf et al.
2011/0155811 A1 6/2011 Rietzler
2011/0155813 A1 6/2011 Forster
2011/0160548 A1 6/2011 Forster
2011/0163849 A1 7/2011 Kruest et al.
2011/0163879 A1 7/2011 Kruest et al.
2011/0175735 A1 7/2011 Forster
2011/0185607 A1 8/2011 Forster et al.
2011/0253794 A1 10/2011 Koskelainen
2011/0256357 A1 10/2011 Forster
2011/0267254 A1 11/2011 Semar et al.
2011/0285511 A1 11/2011 Maguire et al.
2011/0289023 A1 11/2011 Forster et al.
2011/0289647 A1 12/2011 Chiao et al.
2011/0307309 A1 12/2011 Forster et al.
2012/0019358 A1 1/2012 Azevedo et al.
2012/0038461 A1 2/2012 Forster
2012/0050011 A1 3/2012 Forster
2012/0061473 A1 3/2012 Forster et al.
2012/0118975 A1 5/2012 Forster
2012/0154121 A1 6/2012 Azevedo et al.
2012/0164405 A1 6/2012 Webb et al.
2012/0173440 A1 7/2012 Dehlinger et al.
2012/0175621 A1 7/2012 Backlund et al.
2012/0182147 A1 7/2012 Forster
2012/0234921 A1 9/2012 Tiedmann et al.
2012/0235870 A1 9/2012 Forster
2012/0261477 A1 10/2012 Elizondo et al.
2012/0274448 A1 11/2012 Marcus et al.
2012/0279100 A1 11/2012 Burout et al.
2012/0290440 A1 11/2012 Hoffman et al.
2012/0292399 A1 11/2012 Launiainen
2013/0059534 A1 3/2013 Sobalvarro et al.
2013/0075481 A1 3/2013 Raymond et al.
2013/0082113 A1 4/2013 Cooper
2013/0092742 A1 4/2013 Brun et al.
2013/0105586 A1 5/2013 Sykköet al.
2013/0107042 A1 5/2013 Forster
2013/0113627 A1 5/2013 Tiedmann
2013/0135080 A1 5/2013 Virtanen
2013/0135104 A1 5/2013 Nikkanen
2013/0141222 A1 6/2013 Garcia
2013/0161382 A1 6/2013 Bauer et al.
2013/0163640 A1 6/2013 Aiouaz et al.
2013/0265139 A1 10/2013 Nummila et al.
2013/0277432 A1 10/2013 Katworapattra et al.
2013/0285795 A1 10/2013 Virtanen et al.
2013/0291375 A1 11/2013 Virtanen et al.
2014/0070010 A1 3/2014 Diorio et al.
2014/0070923 A1 3/2014 Forster et al.
2014/0073071 A1 3/2014 Diorio et al.
2014/0084460 A1 3/2014 Nieland et al.
2014/0103119 A1 4/2014 Elizondo et al.
2014/0111314 A1 4/2014 Rietzler
2014/0144992 A1 5/2014 Diorio et al.
2014/0158777 A1 6/2014 Gladstone
2014/0191043 A1 7/2014 Forster
2014/0209694 A1 7/2014 Forster
2014/0263655 A1 9/2014 Forster
2014/0263659 A1 9/2014 Kervinen et al.
2014/0266633 A1 9/2014 Marcus
2014/0317909 A1 10/2014 Virtanen
2015/0022323 A1 1/2015 Kruest et al.
2015/0024523 A1 1/2015 Virtanen
2015/0032569 A1 1/2015 Stromberg
2015/0048170 A1 2/2015 Forster
2015/0076238 A1 3/2015 Koskelainen
2015/0107092 A1 4/2015 Bashan et al.
2015/0115038 A1 4/2015 Kuschewski et al.
2015/0181696 A1 6/2015 Elizondo et al.
2015/0227832 A1 8/2015 Diorio et al.
2015/0235062 A1 8/2015 Greefkes
2015/0248604 A1 9/2015 Diorio et al.
2015/0262053 A1 9/2015 Buehler
2015/0328871 A1 11/2015 de Castro
2015/0351689 A1 12/2015 Adams et al.
2015/0353292 A1 12/2015 Roth
2015/0356395 A1 12/2015 Haring et al.
2016/0019452 A1 1/2016 Forster
2016/0027022 A1 1/2016 Benoit et al.
2016/0034728 A1 2/2016 Oliver et al.
2016/0042206 A1 2/2016 Pesavento
2016/0137396 A1 5/2016 Brownfield
2016/0154618 A1 6/2016 Duckett
2016/0157348 A1 6/2016 Elizondo et al.
2016/0162776 A1 6/2016 Kruest et al.
2016/0172742 A1 6/2016 Forster
2016/0172743 A1 6/2016 Forster
2016/0189020 A1 6/2016 Duckett et al.
2016/0203395 A1 7/2016 Huhtasalo
2016/0214422 A1 7/2016 Deyoung et al.
2016/0233188 A1 8/2016 Kriebel et al.
2016/0253732 A1 9/2016 Brown
2016/0321479 A1 11/2016 Uhl et al.
2016/0336198 A1 11/2016 Singleton et al.
2016/0342821 A1 11/2016 Nyalamadugu et al.
2016/0342883 A1 11/2016 Huhtasalo
2016/0364589 A1 12/2016 Roth
2017/0011664 A1 1/2017 Forster et al.
2017/0068882 A1 3/2017 Elizondo et al.
2017/0091498 A1 3/2017 Forster et al.
2017/0098393 A1 4/2017 Duckett et al.
2017/0124363 A1 5/2017 Rietzler
2017/0161601 A1 6/2017 Sevaux
2017/0169263 A1 6/2017 Kohler et al.
2017/0235982 A1 8/2017 Kruest et al.
2017/0243032 A1 8/2017 Pesavento et al.
2017/0286819 A9 10/2017 Huhtasalo
2017/0305068 A1 10/2017 Caldwell et al.
2017/0364716 A1 12/2017 Huhtasalo et al.
2018/0032774 A1 2/2018 Kruest et al.
2018/0096176 A1 4/2018 Greefkes
2018/0101759 A1 4/2018 Forster
2018/0121690 A1 5/2018 Forster et al.
2018/0123220 A1 5/2018 Forster
2018/0137314 A1 5/2018 Roth
2018/0157873 A1 6/2018 Roth
2018/0157874 A1 6/2018 Huhtasalo et al.
2018/0157879 A1 6/2018 Forster
2018/0165485 A1 6/2018 Martinez De Velasco Cortina et al.
2018/0268175 A1 9/2018 Rietzler
2018/0336383 A1 11/2018 Roth
2019/0026616 A1 1/2019 Bourque et al.
2019/0057289 A1 2/2019 Bauer et al.
2019/0087705 A1 3/2019 Bourque et al.
2019/0147773 A1 5/2019 Cockerell
2019/0205724 A1 7/2019 Roth
2019/0220724 A1 7/2019 Huhtasalo
2019/0244072 A1 8/2019 Forster
2019/0251411 A1 8/2019 Gire et al.
2019/0266464 A1 8/2019 Forster
2019/0389613 A1 12/2019 Colarossi
2019/0391560 A1 12/2019 Arene et al.
2020/0006840 A1 1/2020 Forster
2020/0051463 A1 2/2020 Melo
2020/0126454 A1 4/2020 Sevaux
2020/0134408 A1 4/2020 Law
2020/0151401 A1 5/2020 Dyche et al.
2020/0160142 A1 5/2020 Roth
2020/0193260 A1 6/2020 Forster
2020/0193261 A1 6/2020 de Backer
2020/0193455 A1 6/2020 Hoffman et al.
2020/0202294 A1 6/2020 Duckett et al.
2020/0207116 A1 7/2020 Raphael et al.
2020/0249109 A1 8/2020 Singleton et al.
2020/0265446 A1 8/2020 Vargas
2020/0335475 A1 10/2020 Rolland et al.
2020/0381829 A1 12/2020 Andia Vera et al.
2020/0394697 A1 12/2020 Paolella et al.

(56) References Cited

U.S. PATENT DOCUMENTS

| | | | |
|---|---|---|---|
| 2021/0158114 A1 | 5/2021 | Chandramowle et al. | |
| 2021/0215562 A1 | 7/2021 | Boellaard et al. | |
| 2021/0241063 A1 | 8/2021 | Thirappa et al. | |
| 2021/0312471 A1 | 10/2021 | Iyer | |
| 2022/0012439 A1 | 1/2022 | Duckett et al. | |
| 2022/0171951 A1 | 6/2022 | Vargas et al. | |
| 2022/0180014 A1 | 6/2022 | Barr et al. | |
| 2022/0196500 A1 | 6/2022 | Singleton et al. | |
| 2022/0215353 A1 | 7/2022 | Duckett | |
| 2022/0223019 A1* | 7/2022 | Shakedd | G06Q 10/087 |
| 2022/0230134 A1 | 7/2022 | Pursell et al. | |
| 2022/0269919 A1 | 8/2022 | de Backer | |
| 2022/0277152 A1 | 9/2022 | Forster | |
| 2022/0284253 A1 | 9/2022 | Garcia et al. | |
| 2022/0318532 A1 | 10/2022 | Roth | |
| 2022/0358337 A1 | 11/2022 | Diorio et al. | |
| 2022/0358339 A1 | 11/2022 | Forster et al. | |
| 2022/0358340 A1 | 11/2022 | Sowle et al. | |
| 2022/0391654 A1 | 12/2022 | Forster | |
| 2022/0398424 A1 | 12/2022 | Forster | |
| 2022/0398425 A1 | 12/2022 | Roth | |
| 2022/0414356 A1 | 12/2022 | Roth | |
| 2022/0414411 A1 | 12/2022 | Forster | |

FOREIGN PATENT DOCUMENTS

| | | | |
|---|---|---|---|
| CN | 103080392 | A | 5/2013 |
| CN | 110326100 | A | 10/2019 |
| CN | 110945716 | A | 3/2020 |
| DE | 102006051379 | A1 | 4/2008 |
| DE | 102007001411 | A1 | 7/2008 |
| EP | 2057687 | A1 | 5/2009 |
| EP | 2158604 | A2 | 3/2010 |
| EP | 2405054 | B1 | 2/2013 |
| EP | 2585628 | A1 | 5/2013 |
| EP | 3319168 | A1 | 5/2018 |
| EP | 3574521 | A1 | 12/2019 |
| EP | 3662534 | A1 | 6/2020 |
| EP | 3796225 | A1 | 3/2021 |
| EP | 3923195 | A1 | 12/2021 |
| FR | 2905518 | A1 | 3/2008 |
| FR | 2917895 | A1 | 12/2008 |
| FR | 2961947 | A1 | 12/2011 |
| FR | 3058579 | A1 | 5/2018 |
| FR | 3062515 | A1 | 8/2018 |
| FR | 3069962 | A1 | 2/2019 |
| FR | 3078980 | A1 | 9/2019 |
| FR | 3103043 | A1 | 5/2021 |
| FR | 3103044 | A1 | 5/2021 |
| FR | 3103630 | A1 | 5/2021 |
| JP | 2010502030 | A | 1/2010 |
| JP | 2010530630 | A | 9/2010 |
| JP | 5059110 | B2 | 10/2012 |
| JP | 2013529807 | A | 7/2013 |
| JP | 5405457 | B2 | 2/2014 |
| JP | 5815692 | B2 | 11/2015 |
| JP | 2017125274 | A | 7/2017 |
| JP | 6417461 | B1 | 11/2018 |
| JP | 2020505714 | A | 2/2020 |
| WO | 2007104634 | A1 | 9/2007 |
| WO | 2008025889 | A1 | 3/2008 |
| WO | 2009004243 | A2 | 1/2009 |
| WO | 2011161336 | A1 | 12/2011 |
| WO | 2018138437 | A1 | 8/2018 |
| WO | 2019025683 | A1 | 2/2019 |
| WO | 2019175509 | A1 | 9/2019 |

* cited by examiner (Side View)

(Top View)

SECURING A SECURITY TAG INTO AN ARTICLE

FIELD

The present disclosure relates generally to security tags, such as an electronic article surveillance tag, which may be attached to or incorporated into an article, such as a textile or other items. More particularly, the present disclosure relates to a method for securing a security tag into an article, and a security tag configured to perform such a method.

BACKGROUND

Electronic Article Surveillance (EAS) systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with a security tag (such as an RFID and/or an acousto-magnetic (AM) tag), also known as an EAS marker, that, when active, generates a response signal when passed through this interrogation zone. An antenna and receiver in the same or another "pedestal" detects this response signal and generates an alarm.

Additionally, permanent hidden/embedded tags in goods could be used for other purposes, such as, but not limited to circular economy applications (new business models like renting clothes, or selling second hand clothes with known authenticity and pedigree). In many cases the same tag can be used for multiple purposes: security (anti-theft) circular economy, supply chain management and inventory management.

One drawback of tagging goods with EAS markers and other security tags for purposes of theft prevention is that the tag itself is often visible to thieves. Shoplifters in many cases are able to locate the EAS marker and simply remove, disable, or shield an EAS marker element to evade detection by the detection system.

Thus, improvements in security tags are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for providing security tags that are inserted into apparel items.

In an aspect, a method for securing a security tag into an article of clothing includes positioning an end of the security tag into a first opening to an interface space between two layers of the article of clothing, wherein the two layers are fixedly connected by one or more opposing connectors that are spaced apart in a manner to form the interface space sized to receive the security tag; and moving the security tag fully into the interface space.

In another aspect, a security tag includes an elongated substrate; an antenna formed on the elongated substrate; and a radio frequency identifier (RFID) circuit mounted to the antenna. An end of the security tag is configured to be positioned into a first opening to an interface space between two layers of the article of clothing, wherein the two layers are fixedly connected by one or more opposing connectors that are spaced apart in a manner to form the interface space sized to receive the security tag.

Another aspect relates to an article of clothing, comprising at least two overlapping layers of material, wherein the two layers are fixedly connected by one or more opposing connectors that are spaced apart in a manner to form the interface space sized to receive the security tag, and a security tag having an end configured to be positioned into a first opening to the interface space between the two layers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a security tag, such as a passive RFID tag, which is designed to be physically capable of withstanding a variety of the tensile and abrasive forces which occur while positioning the security tag into a sewn item. The security tag, which optionally may be flexible and water-resistant, is configured to be incorporated into an interface between different layers of a textile item, such as a garment or article of clothing. Moreover, the security tag can be discreetly disposed within the item so as to be concealed from view. In some aspects, the security tag is designed to be attached to a tool configured to pull the security tag through the garment and having physical dimensions to fit through existing stitching of the garment.

Turning now to the figures, example aspects are depicted with reference to one or more components described herein, where components in dashed lines may be optional.

Figure 1:
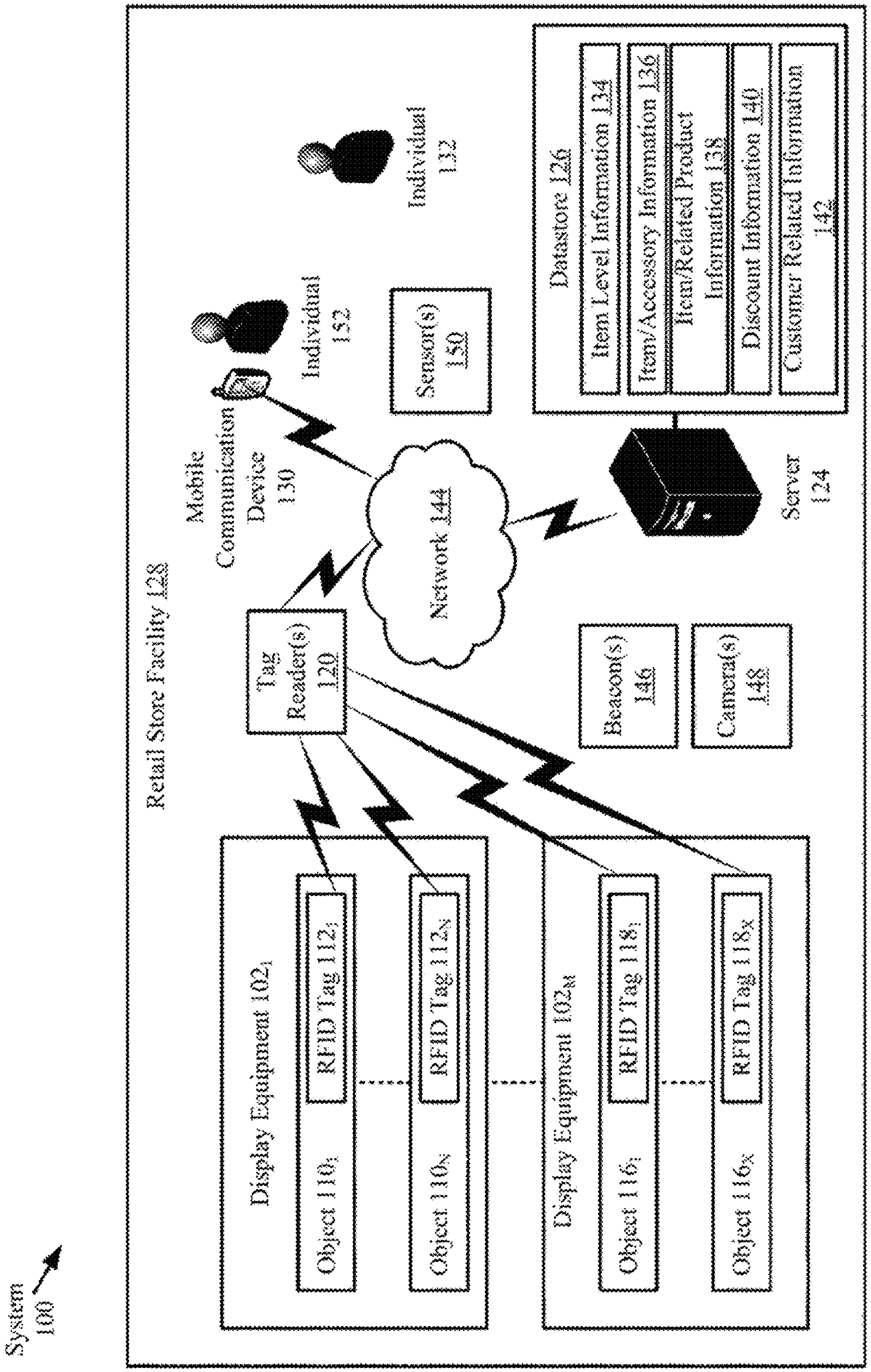
FIG. 1 is an illustration of an illustrative architecture for a system according to some present aspects.

Referring now to FIG. 1, there is provided a schematic illustration of an illustrative system 100 that is useful for understanding the present solution. The present solution is described herein in relation to a retail store environment. The present solution is not limited in this regard and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $\mathbf{102}_1$-$\mathbf{102}_M$ is disposed. The display equipment is provided for displaying objects (or items) $\mathbf{110}_1$-$\mathbf{110}_N$, $\mathbf{116}_1$-$\mathbf{116}_x$ to customers of the retail store. The display equipment can include, but is not limited to, shelves, article display cabinets, promotional displays, fixtures, and/or equipment securing areas of the RSF 128. The RSF 128 can also include emergency equipment (not shown), checkout counters, video cameras, people counters, and conventional EAS systems well known in the art, and therefore will not be described herein.

At least one tag reader 120 is provided to assist in counting and tracking locations of the objects $\mathbf{110}_1$-$\mathbf{110}_N$, $\mathbf{116}_1$-$\mathbf{116}_x$ within the RSF 128. The tag reader 120 comprises an RFID reader configured to read RFID tags.

RFID tags $\mathbf{112}_1$-$\mathbf{112}_N$, $\mathbf{118}_1$-$\mathbf{118}_x$ are respectively inserted into the objects $\mathbf{110}_1$-$\mathbf{110}_N$, $\mathbf{116}_1$-$\mathbf{116}_x$ as described below. This insertion is achieved via an insertion tool, and/or special cuts or notches designed into the garment to improve the ease of inserting, and/or a structural configuration of the RFID tag to enable the insertion. The RFID tags $\mathbf{112}_1$-$\mathbf{112}_N$, $\mathbf{118}_1$-$\mathbf{118}_x$ can alternatively or additionally comprise dual-technology tags that have both EAS and RFID capabilities as described herein. In examples of the technology disclosed herein, the elements of an RFID tag are inserted into an article, for example into an interface between layers of the fabric/cloth of the article, which may be clothing or which may be another retail item, such as a handbag, a backpack, and the like.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $\mathbf{110}_1$, . . . , $\mathbf{110}_N$, $\mathbf{116}_1$, . . . , $\mathbf{116}_x$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet). System 100 also comprises a Mobile Communication Device ("MCD") 130. MCD 130 includes, but is not limited to, a cell phone, a smart phone, a table computer, a personal digital assistant, and/or a wearable device (e.g., a smart watch). In accordance with some examples, the MCD 130 has a software application installed thereon that is operative to: facilitate the provision of various information 134-142 to the individual 152 and/or to facilitate a purchase transaction.

The MCD 130 is generally configured to provide a visual and/or auditory output of item level information 134, accessory information 136, related product information 138, discount information 140, and/or customer related information 142.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. It should be understood that server 124 is configured to: write data to and read data from datastore 126, RFID tags $\mathbf{112}_1$-$\mathbf{112}_N$, $\mathbf{118}_1$-$\mathbf{118}_x$, and/or MCD 130; perform language and currency conversion operations using item level information 134 and/or accessory information 136 obtained from the datastore 126, RFID tags $\mathbf{112}_1$-$\mathbf{112}_N$, $\mathbf{118}_1$-$\mathbf{118}_x$, and/or MCD 130 perform data analytics based on inventory information 134, tag read information, MCD tacking information, and/or information 134-142; perform image processing using images captured by camera(s) 148; and/or determine locations of RFID tags $\mathbf{112}_1$-$\mathbf{112}_N$, $\mathbf{118}_1$-$\mathbf{118}_x$ and/or MCDs 130 in the RSF 128 using beacon(s) 146, tag reader 120 or other devices having known locations and/or antenna patterns.

In some examples, one or more beacons 146 transmitting an RF signal (e.g., a second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112/118 response to the second RF signal is analyzed and compared to data collected by the RFID signal response that occurred concurrently with the tag's passage through the portal.

The server 124 facilitates, updates the information 134-142 output from the MCD 130. Such information updating can be performed periodically, in response to instructions received from an associate (e.g., a retail store employee 132), in response to a detected change in the item level 134, accessory 136 and/or related product information 138, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag 112/118. The sale price is then output from the MCD 130. The present solution is not limited to the particulars of this example.

Although a single MCD 130 and/or a single server 124 is (are) shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information 134 includes, but is not limited to, first information indicating that an RFID tag 112/118 is in motion or that an object is being handled by an individual 152, second information indicating a current location of the RFID tag 112/118 and/or the MCD 130, third information indicating an accessory or related product of the object to which the moving RFID tag is coupled, and/or fourth information indicating the relative locations of the accessory and the moving RFID tag 112/118 and/or the relative locations of the related product and the moving RFID tag 112/118. The first, second and fourth information can be derived based on sensor data generated by sensors local to the RFID tag. Accordingly, the RFID tags $\mathbf{112}_1$-$\mathbf{112}_N$, $\mathbf{118}_1$-$\mathbf{118}_x$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (*a*) detection of when the individual 152 enters the RSF 128, (b) tracking of the individual's movement through the RSF 128, (c) detection of when the individual 152 is in proximity to an object to which an RFID tag 112/118 is coupled, (d) determination that an RFID tag 112/118 is being handled or moved by the individual 152 based on a time stamped pattern of MCD 130 movement and a timestamped pattern of RFID tag 112/118 movement, and/or (e) determination of an association of moving RFID tags 112/118 and the individual 152.

When a detection is made that an RFID tag 112/118 is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag 112/118 is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information 134, accessory information 136, and/or related product information 138.

In those or other scenarios, a sensor embedded in the RFID tag 112/118 detects when an individual 152 is handling the object in which the RFID tag 112/118 is inserted. When such a detection is made, the RFID tag 112/118 retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information related to the product of interest. The present solution is not limited to the particulars of this scenario.

Figure 2:
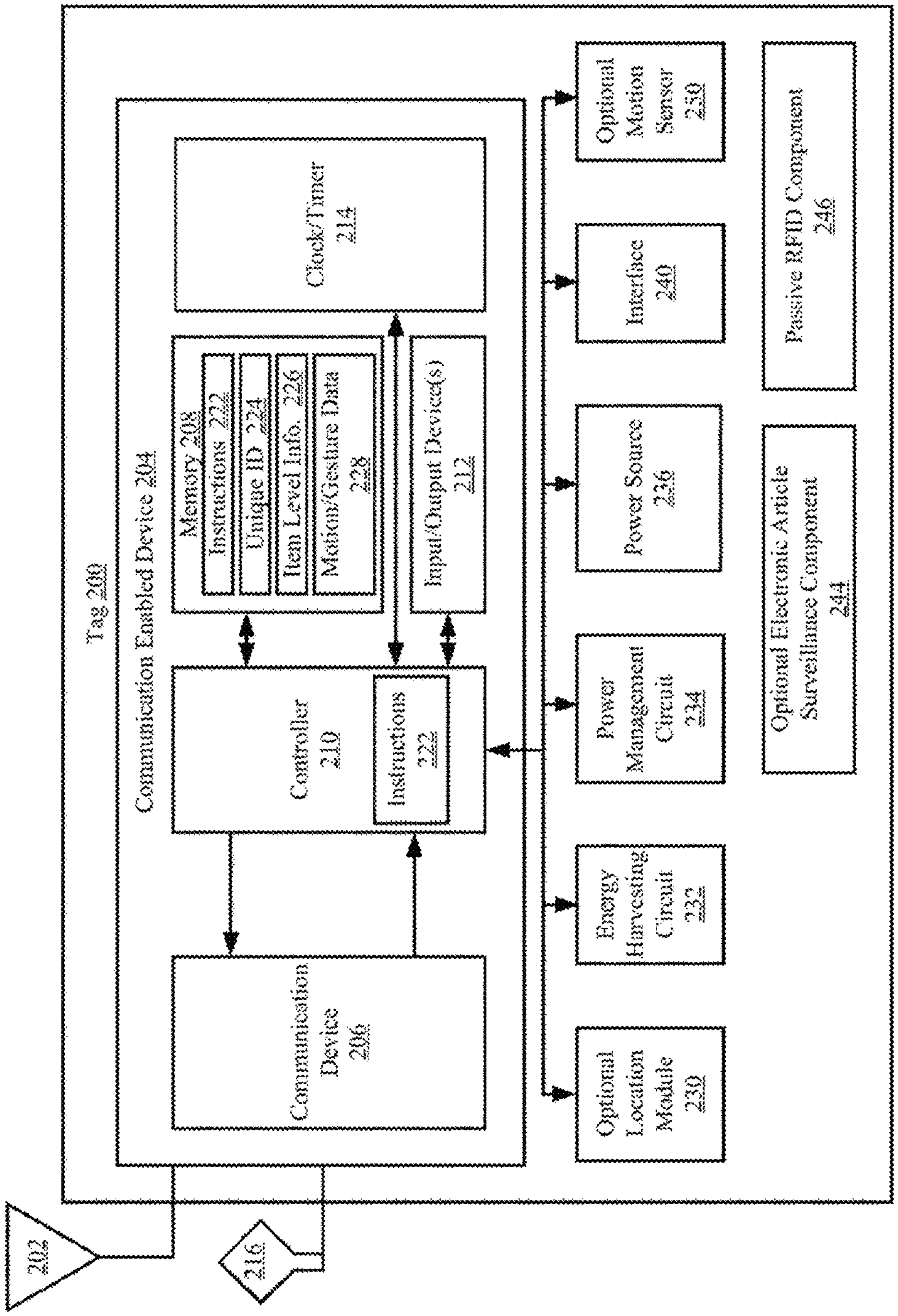
FIG. 2 is an illustration of an illustrative architecture for a security tag according to some present aspects.

Referring now to FIG. 2, there is an illustration of an illustrative architecture for a security tag 200. RFID tags $\mathbf{112}_1$-$\mathbf{112}_N$, $\mathbf{118}_1$-$\mathbf{118}_x$ are the same as or similar to security tag 200. As such, the discussion of security tag 200 is sufficient for understanding the RFID tags $\mathbf{112}_1$-$\mathbf{112}_N$, $\mathbf{118}_1$-$\mathbf{118}_x$ of FIG. 1. In some implementations, security tag 200 may be configured to perform operations such as but not limited to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The security tag 200 can include more or less components than that shown in FIG. 2.

However, the components shown are sufficient to disclose an illustrative aspect implementing the present solution. Some or all of the components of the security tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 is representative of a security tag 200 configured to facilitate improved inventory management/surveillance and customer experience. In this regard, the security tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a RFID technology, a Near Field Communication ("NFC") technology, and/or a Short Range Communication ("SRC") technology. For example, one or more of the following wireless communication technologies (is) are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204 and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software.

Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed security tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 116 of FIG. 1) in which the security tag 200 is inserted.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the security tag 200 can include additional sensors not shown in FIG. 2.

The communication enabled device 204 also facilitates the automatic and dynamic modification of item level information 226 that is being or is to be output from the security tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the security tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server 124 or MCD 130) can then store the information in a database (e.g., datastore 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the security tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the security tag 200 and that cause the security tag 200 to perform any one or more of the methodologies of the present disclosure.

The input/output devices can include, but are not limited to, a display (e.g., an LCD display and/or an active matrix display), a speaker, a keypad, and/or light emitting diodes. The display is used to present item level information 226 in a textual format and/or graphical format. Similarly, the speaker may be used to output item level information 226 in an auditory format. The speaker and/or light emitting diodes may be used to output alerts for drawing a person's attention to the security tag 200 (e.g., when motion thereof has been detected) and/or for notifying the person of a particular pricing status (e.g., on sale status) of the item in which the tag is inserted.

The clock/timer 214 is configured to determine a date, a time, and/or an expiration of a predefined period of time. Technique for determining these listed items are well known in the art, and therefore will not be described herein. Any known or to be known technique for determining these listed items can be used herein without limitation.

The security tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The security tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As described herein, in some aspects, the EAS component 244 disposed in the security tag 200 may be any type of article surveillance mechanism, or combinations thereof. For example, in an aspect, the EAS component 244 may be an EAS sensor and/or an RFID sensor. In some further aspects, the EAS component 244 may include more than one sensor of the same type or of different types. For example, in one non-limiting aspect, the security tag 200 may have dual technology functionality (both RFID and EAS).

In an aspect, the EAS sensor may be a sensor of the type used in Acousto Magnetic (AM) systems. In one non-limiting aspect, for example, the detectors in an AM system emit periodic bursts at 58 KHz, which causes a detectable resonant response in an AM tag. A security tag in a 58 KHz system may also be implemented as an electric circuit resonant at 58 kHz. In an aspect, the EAS sensor to be incorporated into the security tag 200 may have a small and substantially flat form factor, and may have a degree of flexibility.

As shown in FIG. 2, the security tag 200 further comprises an energy harvesting circuit 232 and a power management circuit 234 for ensuring continuous operation of the security tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the security tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists therebetween. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the security tag 200 to selectively enable the communication device 206 (e.g., transceiver) or at least one communications operation only when the tag's location within a facility is actually being changed (e.g., and not when a fan is causing the tag to simply vibrate).

In some scenarios, the security tag 200 can be also configured to enter a sleep state in which at least the motion sensor triggering of communication operations is disabled. This is desirable, for example, in scenarios when the security tag 200 is being shipped or transported from a distributor to a customer. In those or other scenarios, the security tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the security tag 200. In the event all of the storage and harvesting resources deplete to a point where the security tag 200 is about to enter a shutdown/brownout state, the power management circuit 234 can cause an alert to be sent from the security tag 200 to a remote device (e.g., tag reader 120 or server 124 of FIG. 1). In response to the alert, the remote device can inform an associate (e.g., a store employee 132 of FIG. 1) so that (s) he can investigate why the security tag 200 is not recharging and/or holding charge.

The power management circuit 234 is also capable of redirecting an energy source to the security tag's 200 electronics based on the energy source's status. For example, if harvested energy is sufficient to run the security tag's 200 function, the power management circuit 234 confirms that all of the security tag's 200 storage sources are fully charged such that the security tag's 200 electronic components can be run directly from the harvested energy. This ensures that the security tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the security tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that he/she can investigate the issue. It may be that other merchandise are obscuring the harvesting source or the item is being stolen.

The present solution is not limited to that shown in FIG. 2. The security tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the security tag 200. Additionally or alternatively, a switch can be actuated for creating a closed or open circuit. The present solution is not limited in this regard.

In some examples, security tag 200 includes an RFID subsystem, such as communication-enabled device 204 described above, operative to receive an RFID interrogation signal and respond with an RFID response. Such security tags 200 include a non-RFID RF subsystem, also incorporated into communication enabled device 204, operative to receive a non-RFID RF signal and respond by wirelessly indicating that the non-RFID subsystem received the non-RFID RF signal. In some such examples, the non-RFID subsystem responds that the non-RFID RF subsystem received the non-RFID RF signal by one of: allowing the RFID subsystem to respond to the RFID interrogation signal with an RFID response only upon the non-RFID RF subsystem having received a non-RFID RF signal concurrently; supplementing the RFID response with at least one information element indicating that the non-RFID RF subsystem received the non-RFID RF signal; and separately transmitting a non-RFID response. In some such examples, the non-RFID RF subsystem is a personal area network (PAN) signal. In some such examples, the PAN is a Bluetooth PAN.

Figure 3:
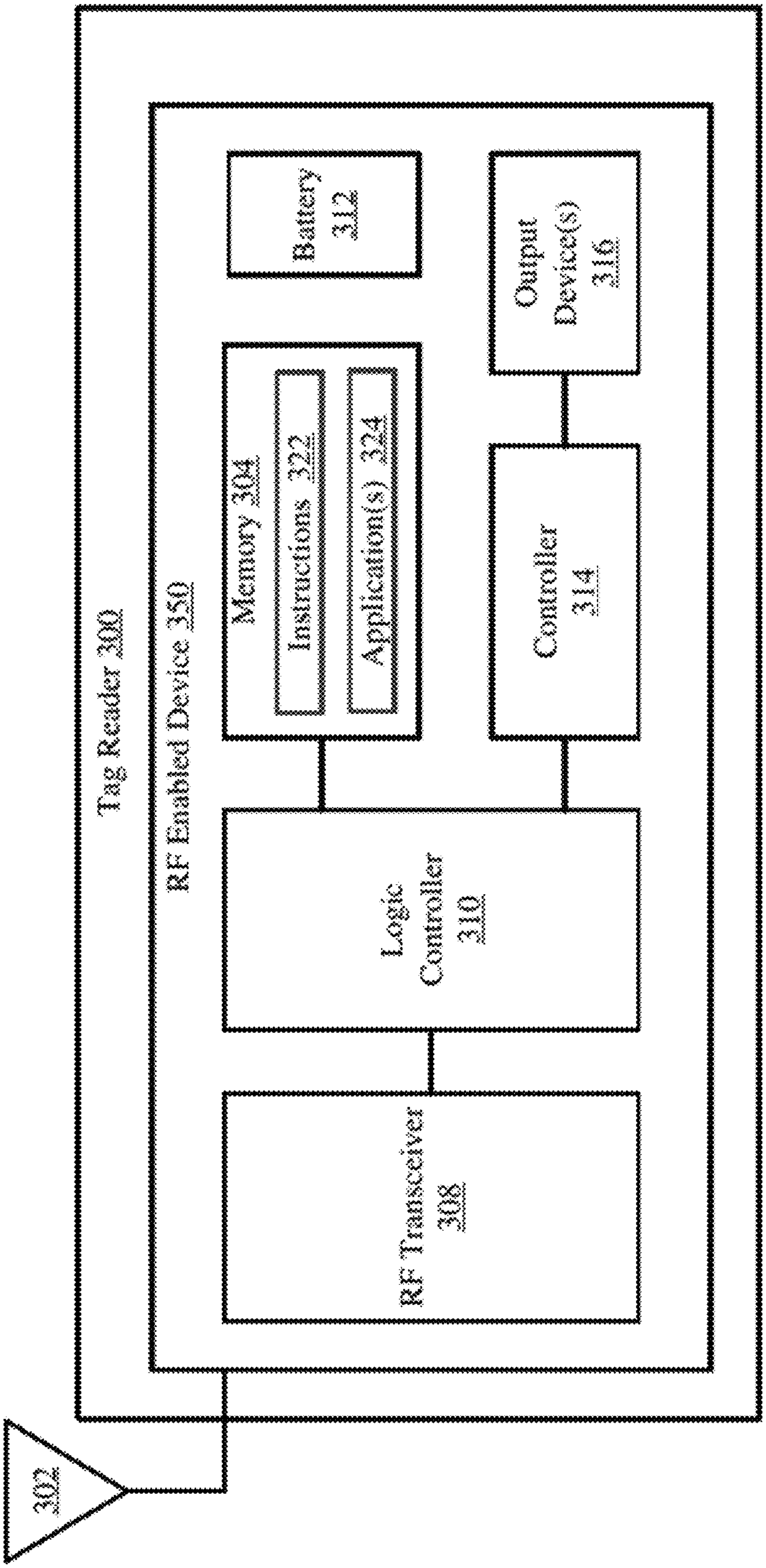
FIG. 3 is an illustration of an illustrative architecture for a tag reader according to some present aspects.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags 112$_1$-112$_N$, 118$_1$-118$_x$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags 112$_1$-112$_N$, 118$_1$-118$_x$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. In an aspect, the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is (are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time, and which RFID tags are also in zone of a second RF signal (e.g., a Bluetooth beacon or NFC or other SRC system).

Figure 4:
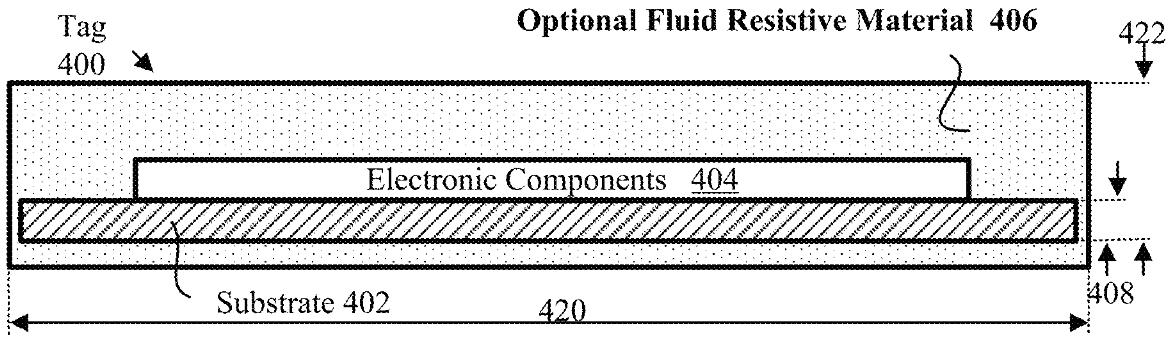
FIG. 4 is a side view of an example architecture for a tag according to some present aspects.
Figure 5:
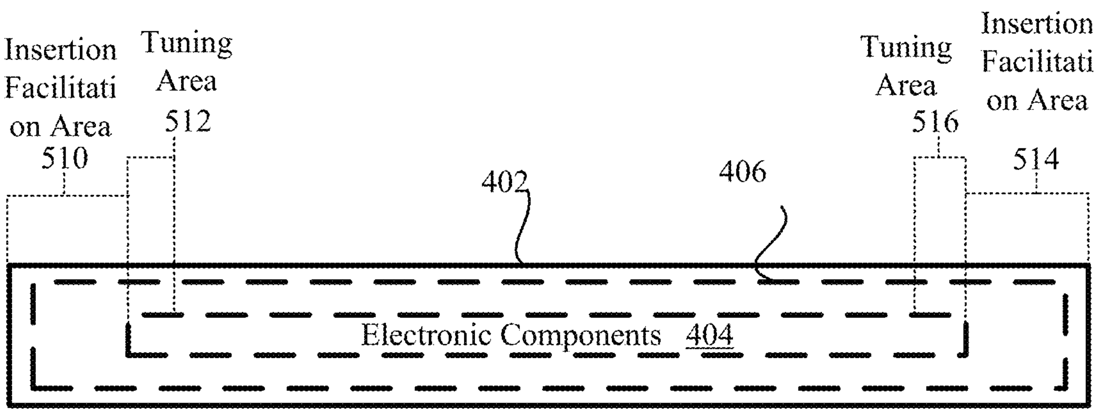
FIG. 5 is a top view of the architecture of FIG. 4.

Referring now to FIGS. 4 and 5, an illustrative architecture for a security tag 400 includes a configuration that enables insertion of the security tag 400 between layers of an article. Security tag 400 may be the same as or similar to tag $\mathbf{112}_1, \ldots, \mathbf{112}_N$, $\mathbf{118}_1, \ldots, \mathbf{118}_X$ of FIG. 1 or security tag 200 of FIG. 2. As such, the discussion provided above in relation to tags 112, 118, 200 is sufficient for understanding the operations of security tag 400. Notably, the security tag 400 is designed to be relatively thin so that it is hard to feel when inserted into an item (e.g., item $\mathbf{110}_1, \ldots, \mathbf{110}_N$, $\mathbf{116}_1, \ldots$, or $\mathbf{116}_X$ of FIG. 1), but thick enough to withstand a certain number (e.g., 2-5) of wash cycles. The item can include, but is not limited to, an article of clothing.

As shown in FIG. 4, security tag 400 comprises a substrate 402 on which electronic components 404 are mounted, attached or disposed. The electronic components 404 can be the same as or similar to electronic components of FIG. 2. Accordingly, the electronic components 404 can include antenna(s), a communication enabled device, and/or an EAS component.

In an example, the substrate 402 is a relatively thin, narrow, light-weight, recyclable and/or machine-washable substrate. In one aspect, the substrate 402 may be an elongated substrate 402. The substrate 402 can include, but is not limited to, any type of flexible material as described above, such as but not limited to a fabric, a silk, a cloth, a plastic, and/or a paper. In some aspects, the substrate 402 may comprise a polyester (e.g., PET) substrate. A thickness 408 of the substrate 402 is selected so that the substrate 402 has a physical strength that allows a threshold amount of tension to be maintained on the security tag 400 while inserting the tag into the item. For example, but not limited hereto, thickness 408 can have a value between 0.0004 inches and 0.008 inches. Further, for example but not limited hereto, a width of the substrate 402 can be between 0.1 inches and 0.2 inches, which is small enough so that the tag is not felt by humans when inserted into an item. The present solution is not limited to the particulars of this example.

In the present aspects, the security tag 400 may be flexible, bendable, stretchable, or otherwise configured and/or constructed to sustain deformations. Also, the flexibility of the security tag 400 allows for the security tag 400 to be constructed and arranged so that the aforementioned deformations do not negatively affect the functionality and operation of the electronic components 404 disposed within the security tag 400. In some aspects, the security tag 400 may be manufactured to satisfy standards of environmental sustainability. For example, in some aspects, a natural-fiber fabric may be used as the substrate layer 402 (or as a portion of the substrate layer 402) so that the security tag 400 incorporates less plastic material than conventional security tags. For example, the security tag 400 may be manufactured using natural-fiber fabric substrates that are sustainable in nature, particularly if the fabric is non-polyester. In some alternative aspects, the flexible fabric substrate may be made of a textile manufactured from recycled plastics, thus allowing the security tag 400 to be manufactured to satisfy sustainability requirements.

In some scenarios, the substrate 402 and electronic components 404 are coated with a layer of a flexible, fluid resistive material 406 for protecting the same from damage due to fluid exposure. The fluid resistive material 406 can be a plastic material. The plastic material may include, but is not limited to, a Thermoplastic Polyurethane (TPU) material, a Polyethylene terephthalate (PET) material, copolyamide, and/or copolyester. Generally, the fluid resistive material 406 may be any waterproof material to protect the electronic components (e.g., by sealing the electronic components hermetically), which can be laminated in industrial processes (such as heat lamination, adhesive lamination or extrusion lamination) and that is safe and acceptable in textile industry (for example Oeko-tex 100 certified materials). In addition, the selected fluid resistive material 406 should be able to withstand exposure to washing, bleaching and softening chemicals.

The fluid resistive material 406 can be applied to either or both sides of the substrate.

The fluid resistive material 406 may be colored to match the color of the item (e.g., item $\mathbf{110}_1, \ldots, \mathbf{110}_N$, $\mathbf{116}_1, \ldots$, or $\mathbf{116}_X$ of FIG. 1) in which the security tag 400 is inserted. The fluid resistive material 406 can be altered in appearance via a heat source. The appearance may be altered by changing from one color and/or pattern to another one of a variety of colors and/or patterns. For example, but not limited hereto, the fluid resistive material 406 can be altered from a clear color to a purple and yellow polka dots.

Still referring to FIG. 4, in yet another alternative aspect, the substrate layer 402 may be made of fabric, or any other type of flexible, sewable material, and the substrate layer 402 may have a thin film of a plastic material, such as but not limited to a thermoplastic polyurethane (TPU) 406, applied to at least one side such that the TPU film 406 provides a substrate for the application of the EAS and/or RFID sensor. After the electronic components 404 are applied to the TPU film 406, another layer of TPU may be applied to provide the coating layer 406 and thereby encapsulate the sensor between two TPU layers.

As shown in FIG. 5, the security tag 400 has an insertion facilitation areas 510, 514 on at least one end, but in some cases both ends. Each insertion facilitation area 510, 514 is formed on an end portion of the security tag 400 and configured to enable insertion of the security tag 400 in between layers of an item. In some implementations, the insertion facilitation area 510 and/or 514 of the security tag 400 facilitates, for example, attachment of a tool to pull the security tag 400 through the opening between two layers and/or between two seams in the article (e.g., a garment) without interference with and/or causing damage to the antenna(s) and/or other electronic components. In other implementations, the insertion facilitation area 510 and/or 514 of the security tag 400 facilitates, for example, pushing the security tag 400 through the opening between two layers and/or between two seams in the article (e.g., a garment) without interference with and/or causing damage to the antenna(s) and/or other electronic components. In some scenarios, insertion facilitation areas 510, 514 may have different stiffness/flexibility from the remaining portion of the tag. The different stiffness/flexibility of the insertion facilitation areas 510, 514 of the security tag 400 may be selected based on whether the security tag 400 is configured to be pushed through or pulled through the opening in the article. In an aspect, greater flexibility of the insertion facilitation areas 510, 514 of the security tag 400 may be achieved, for example, by making the insertion facilitation areas 510, 514 thinner than the remaining portion of the security tag 400. In an aspect, the insertion facilitation areas 510, 514 could have plastic material coating 406 on one side only, while the remaining portion of the security tag 400 has plastic material coating on both sides. In an alternative aspect, the insertion facilitation areas 510, 514 could have no plastic material coating 406, while the remaining portion of the security tag 400 has plastic material coating on one side. In yet another alternative aspect, the insertion facilitation areas 510, 514 could have thinner plastic material coating 406 than the remaining portion of the security tag 400. In an aspect, to facilitate insertion of the security tag 400, the plastic material coating 406 may have flexular modulus (bending modulus of elasticity) of at least 2 GPa, width of at least 2 mm and thickness of at least 50 um.

In some scenarios, the antenna(s) of the electronic components 404 are formed as conductive trace(s) via ink printing and/or deposition (e.g., sputter deposition). The conductive trace/ink/layer, as used throughout may be, but are not limited to, silver, copper, gold, aluminum, nickel, or various forms of carbon, either suspended as particles or dissolved in a solution.

The antenna(s) can be linear or loop. In some scenarios, but not limited hereto, length 420 of the security tag 400 can be in the range of 60-150 mm when the antenna(s) is(are) loop antenna(s). A thickness of the antenna(s) should be as thin as possible provided that the security tag 400 has enough physical strength to withstand a given pulling/pushing force and/or a given number of wash cycles.

The antenna(s) may be designed so that the tag's operating frequency is in a range of 840-960 MHz (inclusive of 840 and 960), a range of 860-940 MHz (inclusive of 860 and 940), a range of 865-868 MHz (inclusive of 865 and 868), or a range of 902-928 MHz (inclusive of 902 and 928). The antenna(s) may additionally or alternatively comprise tuning area(s) 512, 516. Each tuning area 512, 516 comprises a portion of an antenna that can be modified for selectively and/or dynamically tuning an operating frequency of the tag.

In some scenarios, the antenna(s) are formed by coupling physical wire(s) or conductive fibers to the substrate 402. In some aspect, but not limited hereto, each wire may have a diameter between 0.1 mm and 1 mm, and a length between 100 mm and 160 mm.

Figure 6:
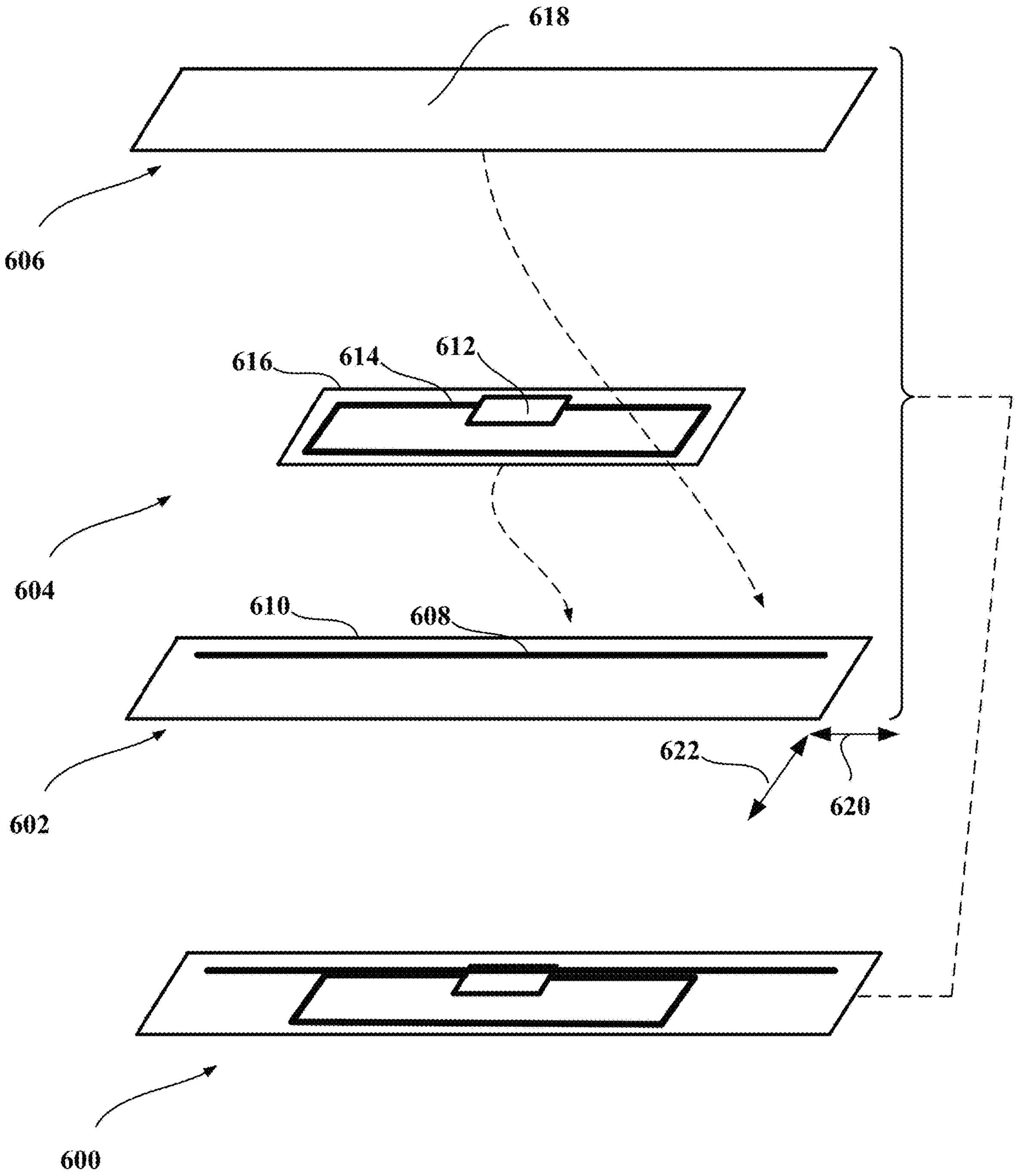
FIG. 6 is a multi-layered security tag 600 according to some present aspects.
Figure 7:
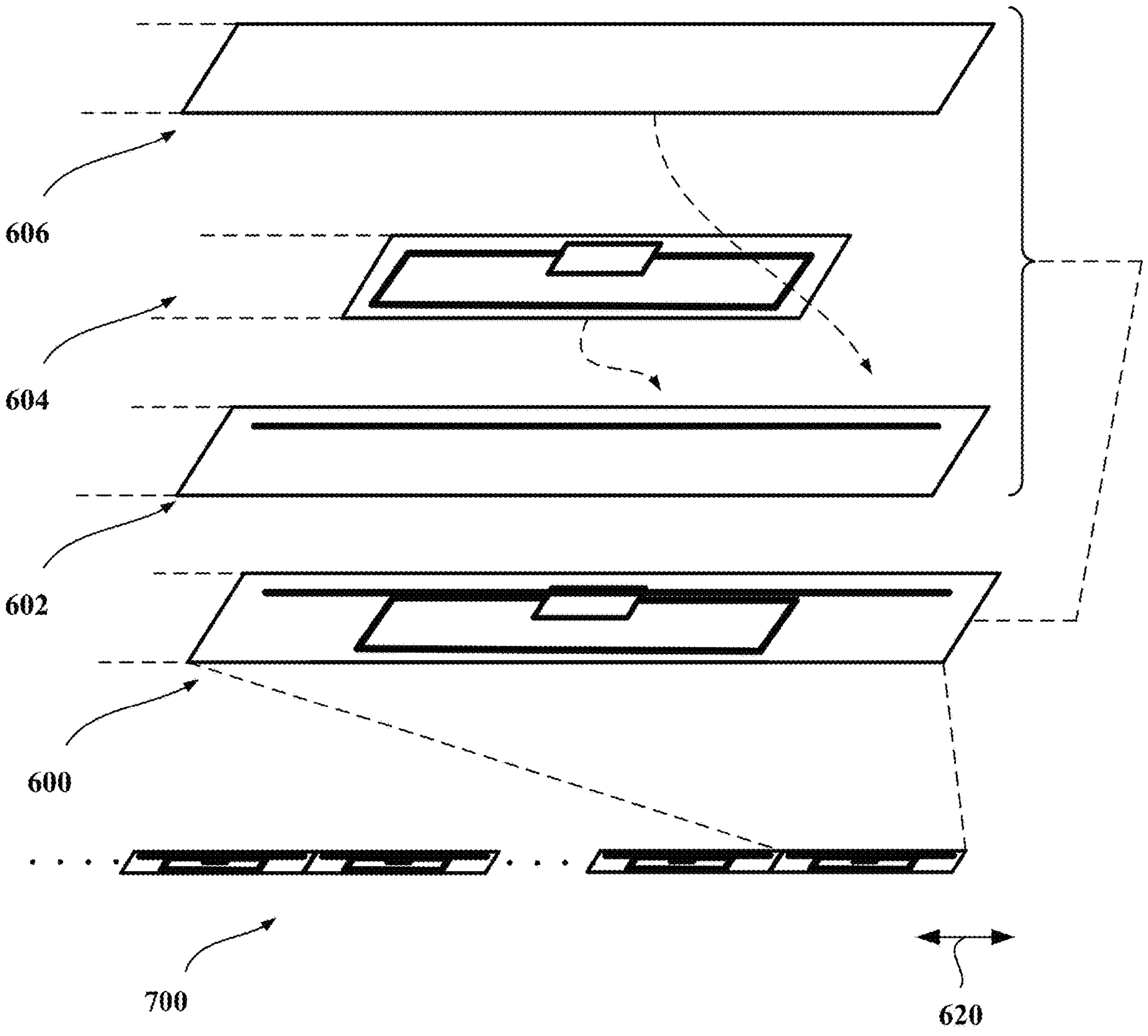
FIG. 7 is a schematic perspective view of a method of manufacturing respective strips of a plurality of security tags from a plurality of elongated material and/or component layers, which are shown above the respective strips in magnified views, according to some present aspects.
Figure 8:
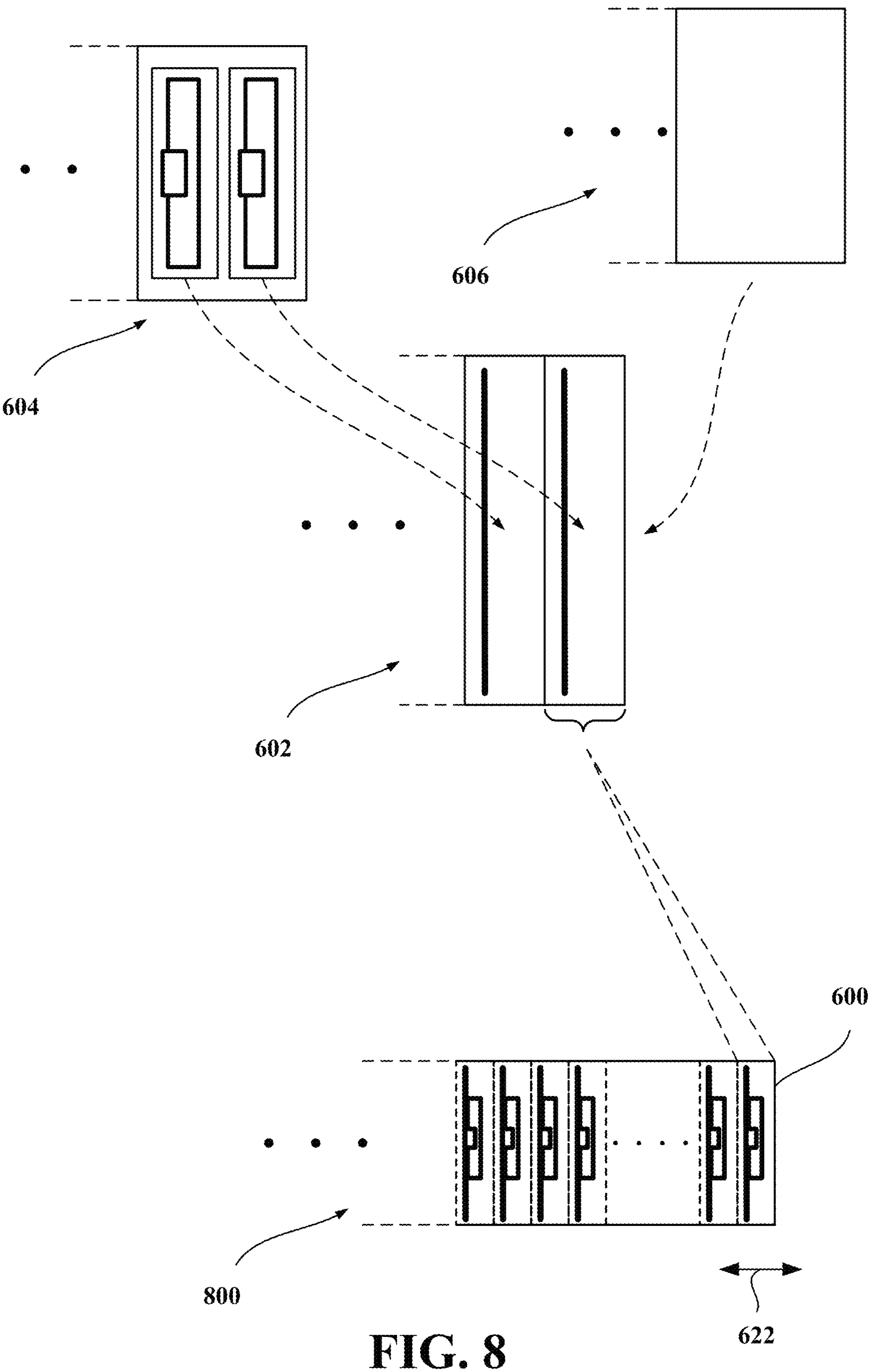
FIG. 8 is a schematic top view of a method of manufacturing respective strips of a plurality of security tags from a plurality of elongated material and/or component layers, which are shown above the respective strips in magnified views, similar to FIG. 7 but with the layers extending in a different direction.

Referring to FIGS. 6-8, one example of a multi-layered security tag 600, similar to the security tag 400 described in FIGS. 4 and 5, may be produced by combining different material and/or component layers, such as a base layer 602, an intermediate layer 604, and an outer layer 606. In one implementation, the base layer 602 includes an antenna stripe 608 attached to a substrate 610, the intermediate layer 604 includes a communication-enabled device 612 electrically connected to a loop antenna 614, both attached to a substrate 616 and electrically connectable with the antenna stripe 608, such as via inductive coupling, and the outer layer 606 includes a protective material 618 that covers the communication-enabled device 612, the loop antenna 614, and the antenna stripe 608. Although the outer layer 606 in this example is illustrated as a top layer, is should be understood that the outer layer may alternatively or additionally include a bottom layer.

Each of the layers 602, 604, and 606 may be an elongated film, for example stored on a roll, and extending in either a first direction 620 or a second direction 622, e.g., respectively parallel or perpendicular relative to a length of the antenna stripe 608 and/or the loop antenna 614.

In one implementation, for example, the substrate 610 of the base layer 602 includes a plastic material, such as a TPU, and the antenna stripe 608 is a metallic electrically conductive material adhered to or printed onto the TPU material. Further, regarding the intermediate layer 604, the communication-enabled device 612 may include an integrated circuit having an RFID chip, the loop antenna 614 is a metallic electrically conductive material adhered to or printed onto the substrate 616, and the substrate 616 may be a plastic material, such as a polyethylene terephthalate (PET). In some alternative or additional implementations, hotmelt adhesive may be used to mount the communication-enabled device 612 to the substrate 616. The outer layer 606 may be a plastic material, such as a TPU.

In one implementation, the intermediate layer 604 is in the form of a wet inlay that is applied onto the base layer 602, with the communication-enabled device 612 and the loop antenna 614 being electrically connected to, or inductively coupled with, the antenna stripe 608, and then the outer layer 606 is laminated, e.g., using heat, onto the base layer 602. It should be understood, however, that the various layers may be manufactured and/or assembled in a different manner and/or in a different order and/or by different entities (e.g., antenna manufacturer, tag manufacturer, tag converter entities). Thus, the methods and structures herein provide a flexible, fabric-like narrow security tag 600 that can be easily and efficiently positioned (pulled or pushed) into a space between seams that connect to adjacent layers of material of an article of clothing.

Referring specifically to FIG. 7, a strip 700 of security tags 600 is formed as described above with the layers 602, 604, and 606 extending in direction 620.

Referring specifically to FIG. 8, a strip 800 of security tags 600 is formed as described above with the layers 602, 604, and 606 extending in direction 620.

Figure 11:
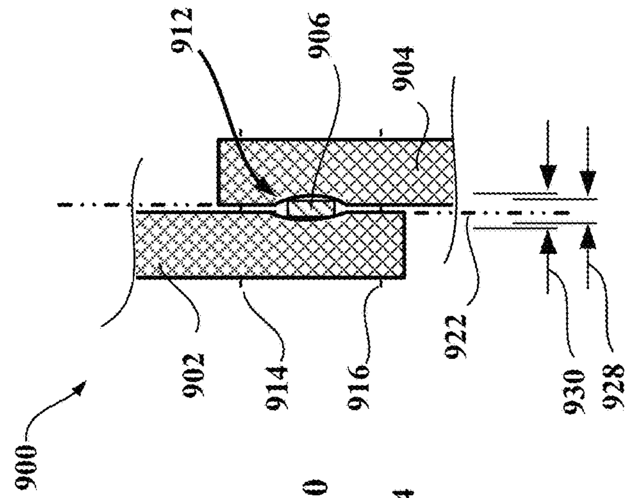
FIG. 11 is a cross-sectional side view of the article and security tag along line 11-11 of FIG. 9.
Figure 9:
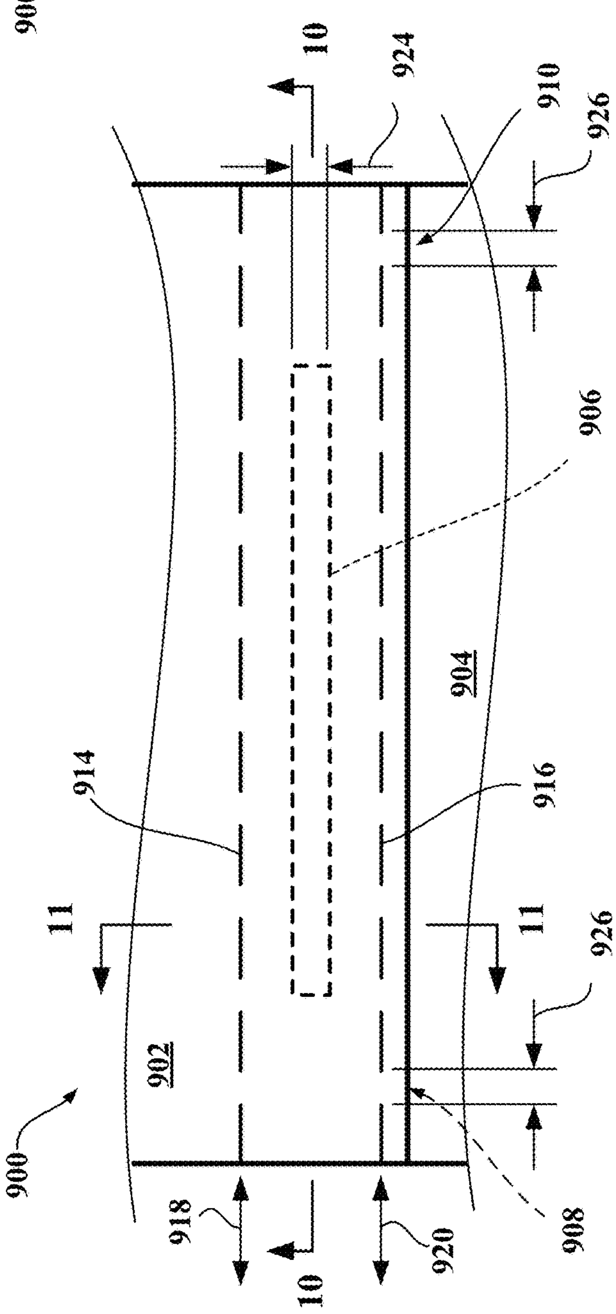
FIG. 9 is a front view of a portion of an example article, such as an article of clothing having two fixedly connected overlapping layers of material, including a security tag positioned through an opening into an interface space between the two layers of material of the article.
Figure 10:
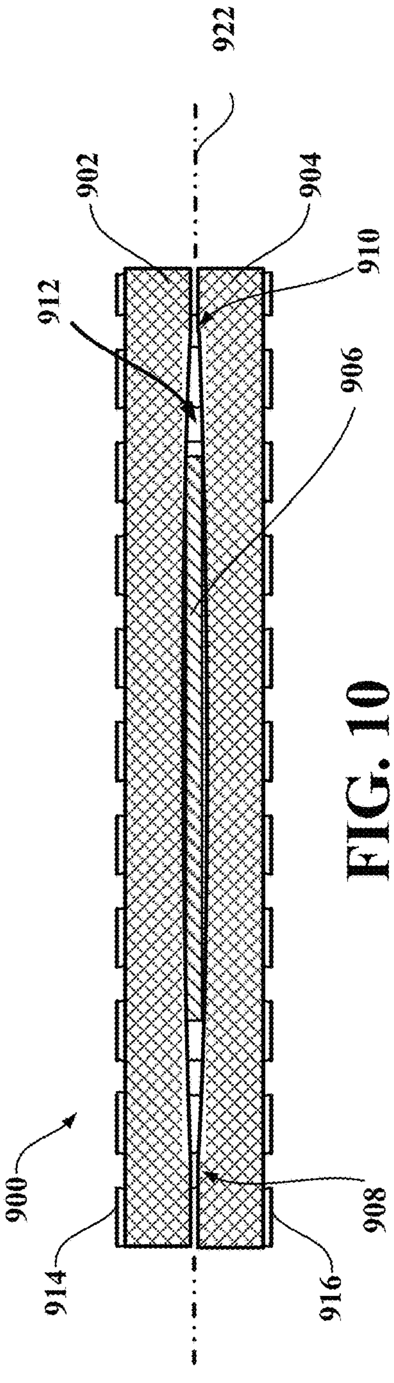
FIG. 10 is a cross-sectional edge view of the article and security tag along line 10-10 of FIG. 9.

Referring to FIGS. 9-11, in one example, an article of clothing 900 having two fixedly connected overlapping layers of material 902 and 904 includes a security tag 906 positioned through at least one opening, such as opening 908 and/or 910, into an interface space 912 between the two layers 902 and 904. The security tag 906 may be the same as or similar to 112, 118, 200, 400, 600. The two overlapping layers of material 902 and 904 may be fixedly connected by one or more opposing connectors 914 and 916 that are spaced apart in a manner to form the interface space 912 sized to receive the security tag 906. For example, in one implementation, the one or more connectors 914 may extend along line 918 and the opposing one or more connector 916 may extend along line 920 to form the interface space 912 extending along a portion of the article of clothing 900. For example, the interface space 912 may be defined as a space extending along an interface plane 922 formed by opposing surfaces of the overlapping layers of material 902 and 904, and further bounded by the one or more opposing connectors 914 and 916. Further, as the layers of material 902 and 904 may be formed of a material that is flexible and/or elastic, the interface space 912 may expand and/or deform to accommodate receiving the security tag 906 upon insertion of the security tag 906, and/or to accommodate receiving a tool used to insert the security tag 906, into the interface space 912. Suitable examples of the layers of material 902 and 904 may include, but are not limited to, any natural and/or artificial fabric or material used to make clothing or other articles, such as but not limited to cotton, polyester, stretch fabric (e.g., neoprene, elastomerics, spandex, elastane), leather, silk, hemp, etc. Although lines 918 and 920 are illustrated as straight lines, it should be understood that they may be curved lines, or a combination of straight lines, curved lines, and/or straight and curved lines. The one or more opposing connectors 914 and 916 may be any type of device and/or mechanism able to fixedly attach layer of material 902 to layer of material 904. Suitable examples of the connectors 914 and 916 may include, but are not limited to, thread, adhesive, rivets, anchors, fasteners, welds (e.g., via sonic welding), and/or any other layer-connecting mechanism. In some cases, the connectors 914 and 916 may be a double-stitched seam, where each connector 914 and 916 is a separate seam. For instance, in this case, each seam may be formed from a stitch of thread, such as but not limited to a chain stitch.

In this example, the security tag 906, and/or a tool used to insert the security tag 906 into the interface space 912, is sized to fit within opening 908 and/or 910. For example, a width 924 of the security tag 906 (and/or a tool used to position the security tag 906) may be equal to or less than a width 926 of the opening 908 and/or 910, and a height 928 of the security tag 906 (and/or a tool used to position the security tag 906) may be equal to or less than a height 930 to which the interface space 912 may deform and/or expand. In one example, the opening 908 and/or 910 may be formed near an end of at least one of the overlapping layers of material 902 and 904 by a spacing between adjacent ones of the connectors 916, such as along line 920.

In some cases, referred to as push-through placement, the security tag 906 may be pushed into one of the openings 908 or 910 and positioned within the interface space 912. In other cases, referred to as pull-through placement, the security tag 906 may be pulled into one of the openings 908 or 910 and positioned within the interface space 912. For example, in one implementation of a pull-through placement, an elongated tool such as a bodkin or a needle may be inserted into a first opening, such as opening 908, extended through the interface space 912 and out of a second opening, such as opening 910, and connected to an end of the security tag 906. Then, the elongated tool with the security tag 906 attached may then be pulled back through the interface space 912 in order to position the security tag 906 within the interface space 912. In some cases, the elongated tool and an end of the security tag 906 attached to the elongated tool may be pulled out of the first opening, and then the security tag 906 is disconnected from the elongated tool and pushed back into the first opening in order to finally position the security tag 906 in the interface space 912. In some cases where both openings are present, the openings 908 and 910 may be spaced apart a distance greater than a length of the security tag 906, for example, to enable the elongated tool and the security tag 906 to be maneuvered into the interface space 912. In other implementations, the openings 908 and 910 may be spaced apart a distance less than a length of the security tag 906, for example, when the two fixedly connected overlapping layers of material 902 and 904 are sufficiently flexible and/or elastic and/or deformable, and/or when the security tag 906 is sufficiently flexible, to enable the elongated tool and the security tag 906 to be maneuvered into the interface space 912.

Figure 14:
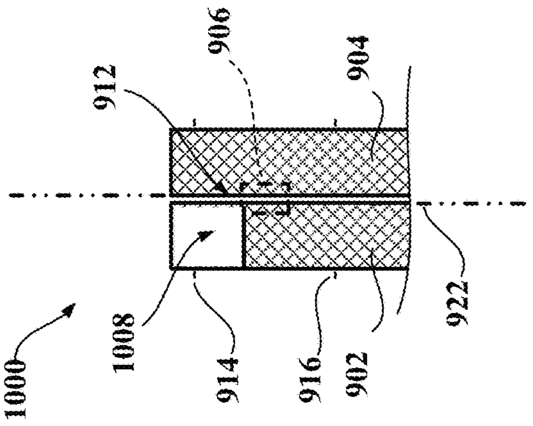
FIG. 14 is a cross-sectional view of the article and security tag along line 11-11 of FIG. 12.
Figure 12:
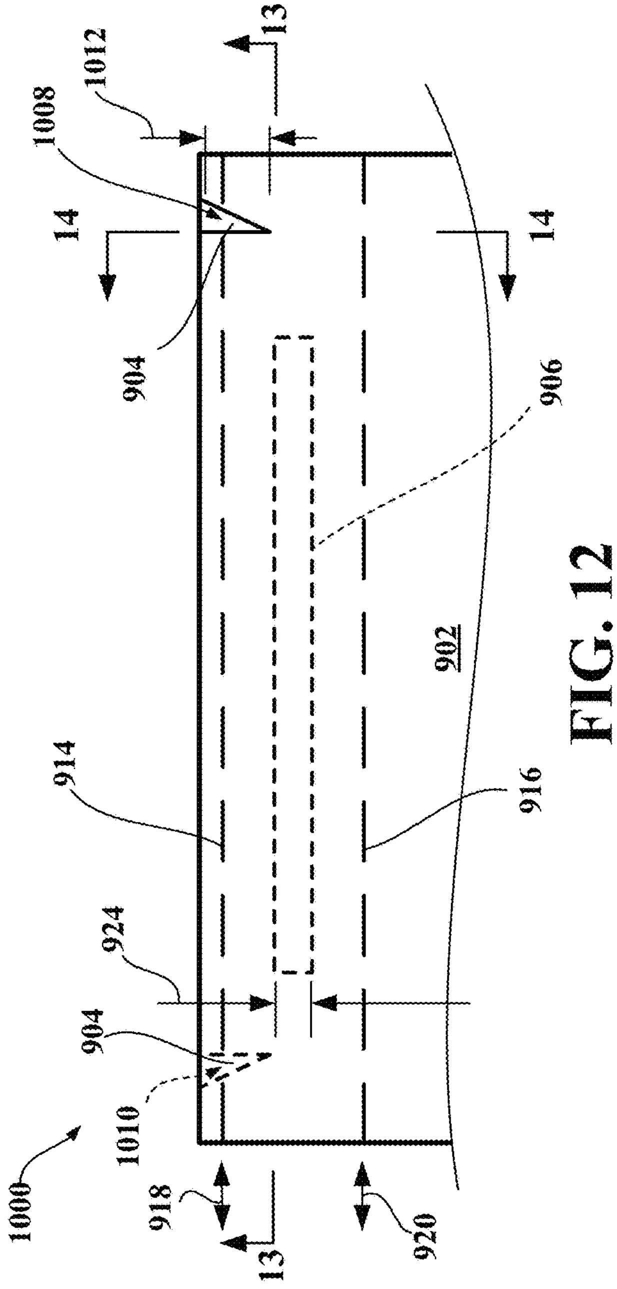
FIG. 12 is a front view of a portion of another example article, such as an article of clothing having two fixedly connected overlapping layers of material with one layer having a notch, including a security tag positioned through the notch into an interface space between the two layers of material of the article.
Figure 13:
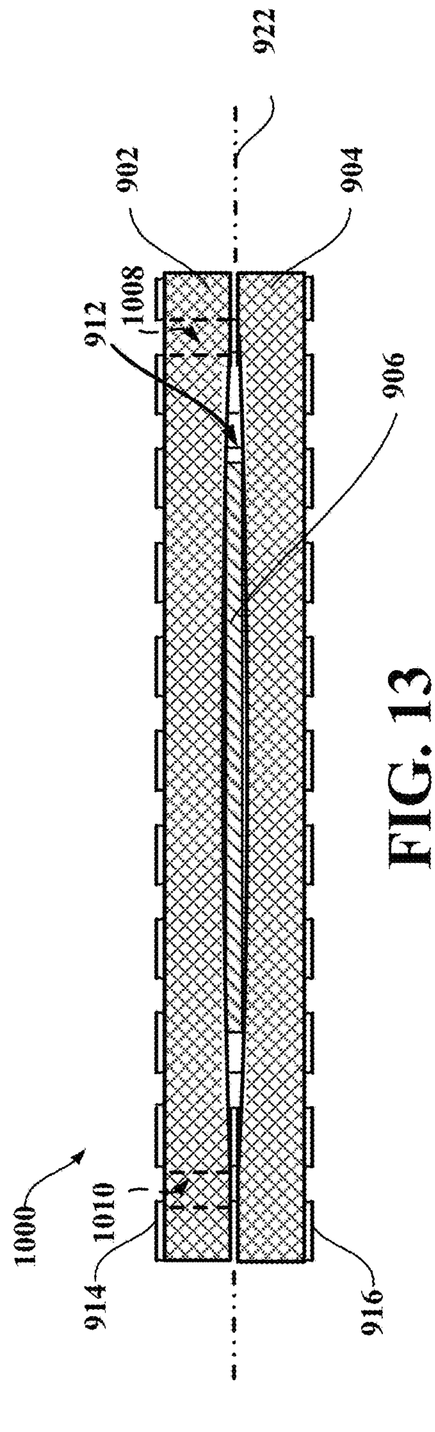
FIG. 13 is a cross-sectional view of the article and security tag along line 10-10 of FIG. 12.

Referring to FIGS. 12-14, in another example, an article of clothing 1000 is similar to the article of clothing 900 (FIGS. 9-11) in that is has two fixedly connected overlapping layers of material 902 and 904 and includes the security tag 906 positioned through at least one opening into the interface space 912, but in this case the at least one opening 1008 is in the form of a notch in one of the layers of material, such as in layer 902. The opening 1008, also referred to as notch 1008, in one layer of material, such a layer of material 902, exposes an inner surface of the opposing layer of material 904, thereby enabling the security tag 906 to be positioned within the interface space 912. The notch 1008 may have any size and/or shape sufficient to accommodate insertion of the security tag 906. For instance, the notch 1008 includes an opening dimension 1012, such as a width or length, equal to or greater than a width 924 of the security tag 906. Although illustrated herein as having an angular shape, it should be understood that the notch 1008 may have any shape configured to allow insertion of the security tag 906 into the interface space 912. In some cases, such as in a push-through placement of the security tag 906, the article of clothing 1000 may only have a single opening or notch 1008. In an alternative or additional case, such as in a pull-through placement of the security tag 906, the article of clothing 1000 may have a second opening or notch 1010 spaced apart from the first opening or notch 1008. As noted above with respect to the openings 908 and 910 of FIG. 9, the notches 1008 and 1010 may be spaced apart a distance greater than or less than the length of the security tag 906. In an implementation where the spacing of the notches 1008 and 1010 is less than the length of the security tag 906, such spacing may reduce the likelihood of the security tag 906 being able to work its way out of one of the notches 1008 and 1010 once positioned within the interface space 912. The connectors 914 and 916 may be the same as those described above, but the use of the notch 1008 and/or 1010 may be particularly suited for use with the connectors 914 and 916 including an overlock sewn stitch, where otherwise it may be difficult to find an area that provides an opening to the interface space 912 sufficiently sized to receive the security tag 906.

Consequently, in some cases, the configuration of the article of clothing 1000 including one or both notches 1008 and 1010 improves the ease of inserting the security tag 906 and reduces the time required to insert the security tag 906 in between the two layers of layers of material 902 and 904, such as when connected with overlock sewn stitches. The notch 1008 and/or 1010 or cut can be designed into the clothing pattern and added to the manufacturing process either at a cutting table prior to fabric assembly, during the cut and sew production, or added after the article of clothing 1000 is sewn.

In some implementations, the notch 1008 and/or 1010 or cut provides a preset location for the tool used in the pull-through placement scenario, allowing the security tag 906 to be more easily inserted. The notch 1008 and/or 1010 or cut eases the insertion of the tool by providing a path through one material layer and using the second material layer to provide a backing to begin sliding the tool between the two material layers contained in the sewn article of clothing 1000.

Referring to FIGS. 15A-15H, in one example implementation of one or more aspects described herein, a method for securing a security tag into an article of clothing includes using a tool to position the security tag into the interface space between two overlapping and fixedly connected layers of material. In order to insert a security tag into clothing articles (such as sewn garments) quickly and cost effectively, a tool such as, but not limited to, an elongate needle or bodkin 904, illustrated in FIG. 9A, may be provided.

In the method illustrated in FIGS. 15A-15H, after the article of clothing 1502 is finished, e.g., sewn together, the bodkin 1504 or other tool is moved, e.g., pushed by hand, into a first opening 1505 between two stitching lines 1506*a* and 1506*b* that fixedly attach two overlapping layers of fabric. In some aspects, inserting the bodkin 1504 into the first opening 1505 includes inserting the bodkin 1504 between a loop of a stitch of thread.

Figure 15A:
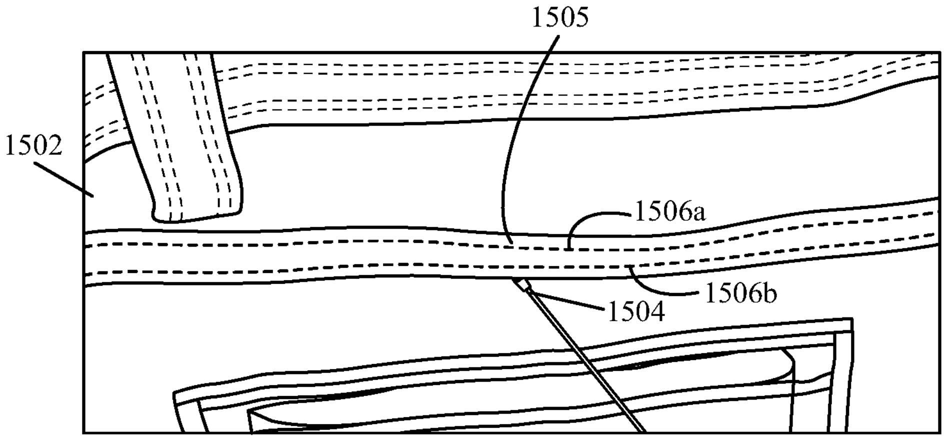
FIGS. 15A-15H provide illustrations of a method for securing a security tag into an article of clothing using a tool according to some present aspects.
Figure 15B:
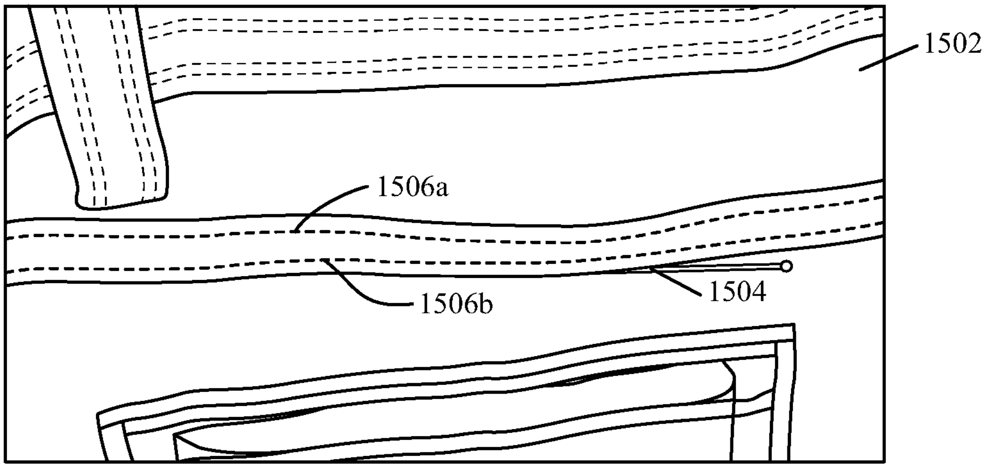

Next, as shown in FIG. 15B, the bodkin 1504 may be turned approximately 90 degrees and further translated within the interface space between the two stitching lines 1506*a* and 1506*b* and between the two layers of fabric. In an aspect, the length of the bodkin 1504 may be equal to or greater than the length of the security tag 1508 being inserted to enable the bodkin 1504 to extend far enough through interface space and the two stitching lines 1506*a* and 1506*b* to attach to, and be detached from, the security tag 1508 (shown in FIG. 15D).

Figure 15C:
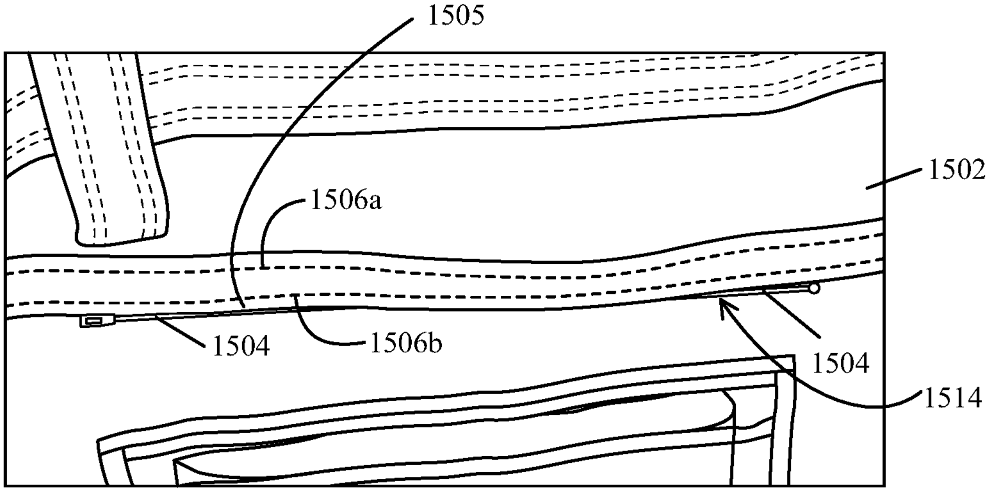

For example, the bodkin 1504 may be pushed through the first opening 1505, through the interface space between the two stitching lines 1506*a* and 1506*b*, and partially out of a second opening 1514, such that the opposing end of the bodkin 1504 are respectively extending out of the second opening 1514, as shown in FIG. 15C, and the first opening 1505. In some aspects, extending the bodkin 1504 out of the second opening 1514 includes inserting the bodkin 1504 between a loop of a stitch of thread.

Figure 15D:
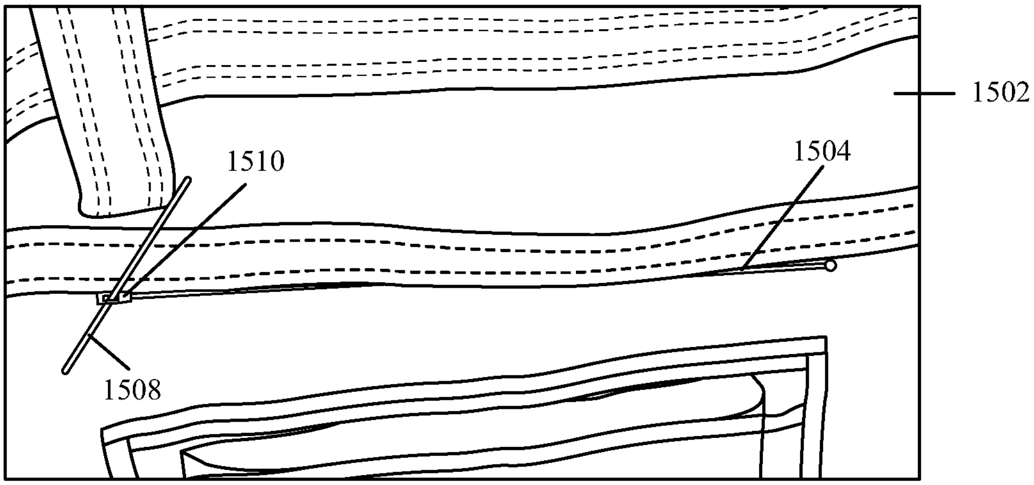

Subsequently, referring to FIG. 15D, one end of the security tag 1508 may be passed through an eyelet 1510 of the bodkin 1504, e.g., at the end of the bodkin 1504 extending out of the first opening 1505. As noted above, the security tag 1508 may be flexible, bendable, stretchable, or otherwise configured/constructed to sustain deformations. The security tag 1508 may be the same as or similar to tag $\mathbf{112}_1, \ldots, \mathbf{112}_N$, $\mathbf{118}_1, \ldots, \mathbf{118}_X$ of FIG. 1, security tag 200 of FIG. 2, security tag 400 of FIGS. 4 and 5, security tag 600 of FIGS. 6-8, security tag 900 of FIG. 9, or security tag 1000 of FIG. 10. As such, the discussion provided above in relation to the above-noted tags is sufficient for understanding the operations of security tag 1508. In an aspect, only the insertion facilitation areas 510, 514 of the security tag 1508 (shown, for example in FIG. 5) may be passed through the eyelet 1510 of the bodkin 1504 and folded over. Advantageously, the insertion facilitation areas 510, 514 contain no electronic components.

Figure 15E:
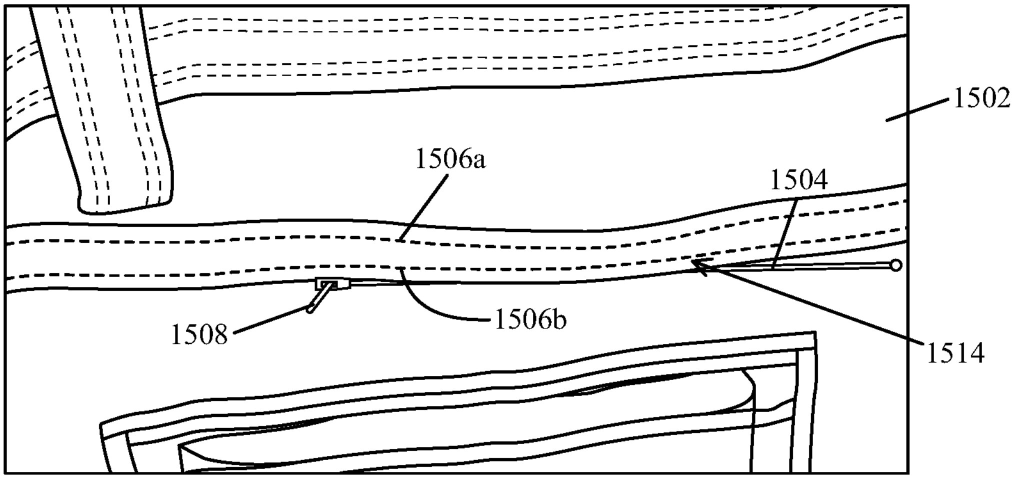

When the security tag 1508 is releasably connected to the bodkin 1504, the bodkin 1504 may be pulled through the second opening 1514, so that the security tag 1508 is moved fully into an interface space between the two stitching lines 1506*a* and 1506*b*, as shown in FIG. 15E.

Figure 15F:
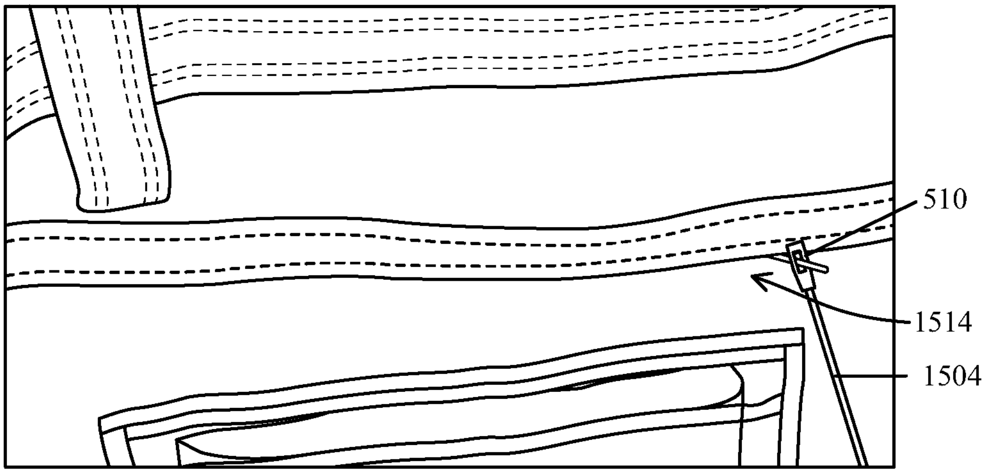

In FIG. 15F, the bodkin 1504 may be pulled until the insertion facilitation area 510 of the security tag 1508 exits through the second opening 1514.

Figure 15G:
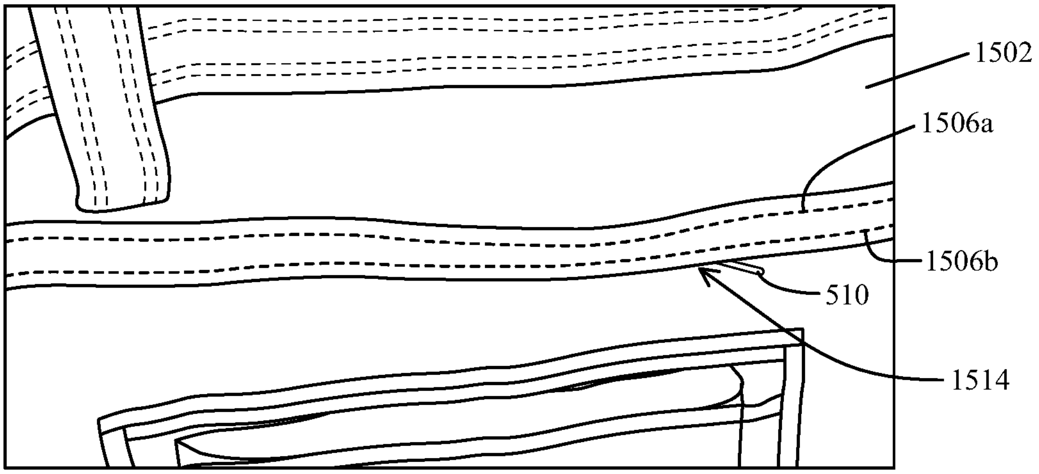

In FIG. 15G, the bodkin 1504 is disconnected from the security tag 1508, leaving the insertion facilitation area 510 extending out of the second opening 1514.

Subsequently, the insertion facilitation area 510 may be pulled back into the interface between the two stitching lines 1506*a* and 1506*b* through the second opening 1514.

Figure 15H:
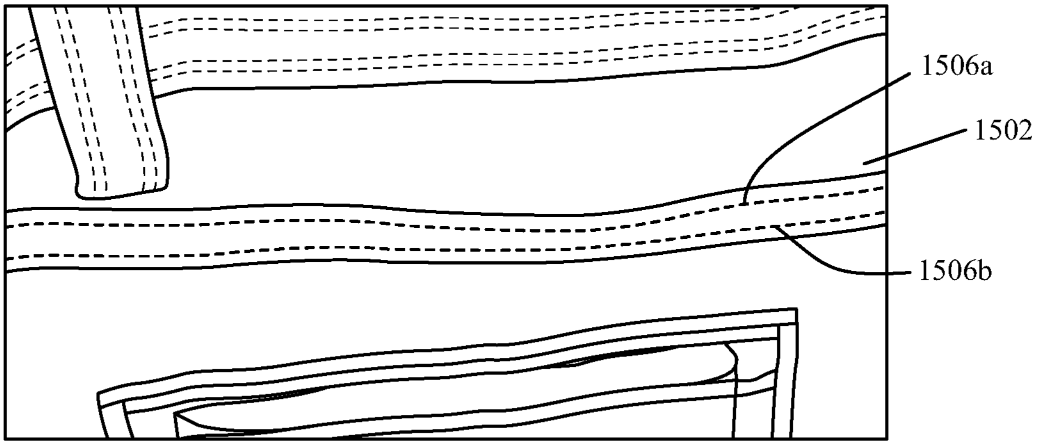

In FIG. 15H, the end result of the disclosed method includes the security tag 1508 being completely concealed between the stitching lines 1506*a* and 1506*b* (and/or between two layers of fabric) of the article of clothing 1502.

Figure 16A:
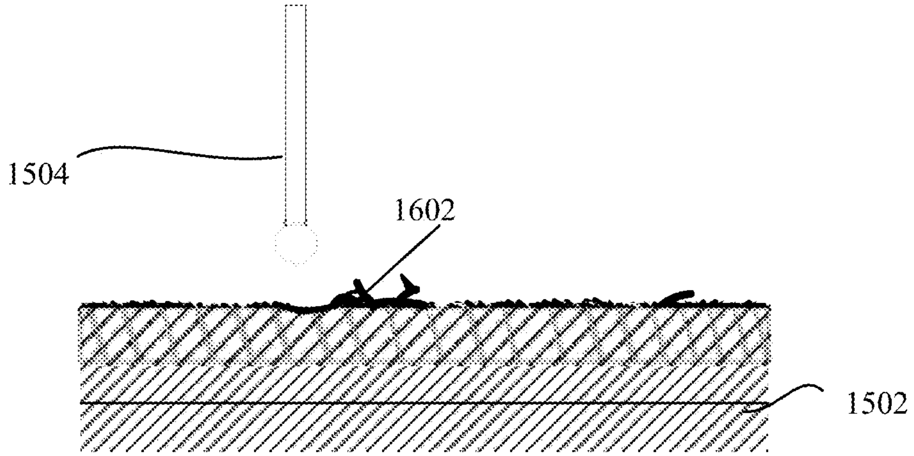
FIGS. 16A-16B provide illustrations of an insertion notch designed into the article of clothing pattern to facilitate insertion of the sensor into the article of clothing according to some present aspects.
Figure 16B:
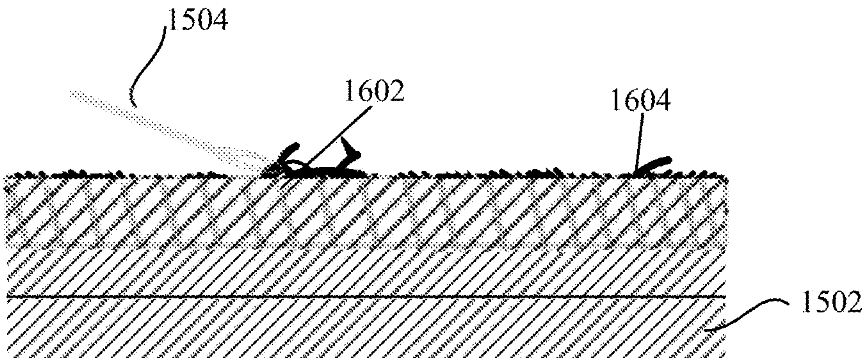

Referring to FIGS. 16A-16B, in one example implementation of one or more aspects described herein, an insertion notch is configured in one layer of fabric of the article of clothing 1502 to facilitate insertion of the security tag 1508 into an interface space between overlapping layers of fabric fixedly connected with overlock stitches. In an aspect, to facilitate the insertion of the security tag 1508, the first opening may comprise a notch 1602 in a first layer of the two layers of the article of clothing 1502, as shown in FIG. 16A. The two layers of the article of clothing 1502 may be stitched together by overlock stitches. In various aspects, the notch 1602 may be designed into the article of clothing item 1502 pattern and added to the process either at the cutting line prior to fabric assembly, during the cut and sew production or may be carefully added after the article of clothing 1502 is sewn.

The notch 1602 constitutes a preset area of the article of clothing 1502 into which the tools used in the method described in FIGS. 15A-15H may be more easily inserted. FIG. 16B shows the entry of the tool (for example, bodkin tool 1504) at the notch 1602. The notch 1602 allows the bodkin tool 1504 to slide between the two fabric layers of the article of clothing 1502, providing cover for the security tag 1508. In other words, the notch 1602 may facilitate the insertion of the bodkin tool 1504 by providing a path through one fabric layer of the article of clothing 1502 and using the second fabric layer to provide a backing to begin sliding the bodkin tool 1504 between the corresponding fabric layers contained in the sewn article of clothing 1502. In an aspect, to facilitate the insertion of the security tag 1508, the second opening may comprise a second notch 1604. Advantageously, at least one of the notches 1602 and 1604 may effectively facilitate attachment of the security tag 1508 to the article of clothing 1502 using the method described above in conjunction with FIGS. 15A-15H.

In some aspects, the security tag 1508 described herein with reference to various aspects may be configured to be flexible and also impervious to detergents, water, grease, oil, dirt, harsh chemicals, etc. In some non-limiting aspects, for example, the security tag 1508 may include an RFID inlay that provides flexibility so that the chip and antenna of the RFID inlay can be repeatedly stretched and deformed without damaging the functionality of the security tag 1508.

In some non-limiting aspects, the security tag 1508 described herein with reference to various aspects may be inserted, or otherwise incorporated into, any type of apparel and garments, handbags, belts, shoes, caps, hats, scarves, ties and other accessory items, etc. For example, in one non-limiting aspect, the security tag 1508 may be hidden behind the seams of running shoes. The security tag 1508 may also be used for household-type textiles, such as bed furnishings, window curtains, pillows, furniture cushions, blinds, table cloths, napkins, etc. The security tag 1508 may also be incorporated into camping tents and textile utility items, such as tarps. The security tag 1508 is particularly suitable for attachment to goods of a flexible, pliant nature (such as textiles). It will be understood that a list of possible applications for the security tag 1508 would be exhaustive in nature, and are not limited to those mentioned herein.

In some aspects, the security tag 1508 described herein with reference to various aspects may be inserted into an article of clothing 1502 by hand in such a way that the security tag 1508 is hidden or wholly undetectable when inserted into the article of clothing 1502. The security tag 1508 may be constructed using a soft, flexible substrate (e.g., TPU and/or fabric) and a sealing layer which is a flexible material coating (e.g., TPU). Since the security tag 1508 is soft and flexible, a person wearing or handling the article of clothing 1502 into which the security tag 1508 is inserted may not feel the presence of the security tag 1508. This also ensures that the security tag 1508 will not irritate a person's skin by continued contact with protruding components.

In some aspects, the security tag may be affixed into a desired position within the item (e.g., within the interface space or seam) by heat sealing (with heated tool) or High Frequency (HF) welding (depending on exact material) of the security tag to one or both of the fixedly connected layers, e.g., to the fabric or other material. As such, the material of the security tag, such as the substrate and/or any outer layer, may be a material suitable for attachment to the material of one or both layers.

In some aspects, the location within the item for inserting the security tag 1508 may be optimized based on RF reading properties. Furthermore, some locations provide better protections for the security tag 1508 in the washing cycle, for example.

In some aspects, the security tag 1508 may be inserted into an item without any tools. In one example, the end (the insertion facilitation areas 510, 514) of the security tag 1508 may be attached to a string, yarn or cable. In this case, the security tag 1508 may be moved utilizing the string, yarn or cable. For example, the string, yarn or cable may be placed into the interface space before two layers of fabric are sewn, such as in a position where the opposing ends of the string, yarn or cable extend out of the first opening and the second opening, respectively, when the two layers are fixedly connected.

In some aspects, the security tag 1508 inserted into an article of clothing 1502 may be removed at a later time, for example, by inserting a tool between the stitch lines concealing the security tag 1508. In such case, the security tag 1508 may be reused and inserted into a different item as described above.

In some aspects, the width of the security tag 1508 may range between about 1 mm and about 5 mm and the length of the security tag 1508 may range between about 80 mm and about 140 mm.

In other words, one aspect of the method for securing a security tag into an article of clothing includes positioning an end of the security tag into a first opening to an interface space between two layers of the article of clothing. The two layers are fixedly connected by one or more opposing connectors that are spaced apart in a manner to form the interface space sized to receive the security tag. The security tag is moved fully into the interface space.

In one or any combination of these aspects, the method further includes inserting a tool into a second opening to the interface space that is spaced apart from the first opening; moving the tool to extend out of the first opening; connecting the security tag to the tool; and moving the tool, with the security tag releasaby connected thereto, back out of the second opening.

In one or any combination of these aspects, inserting the tool into the second opening includes inserting the tool between a loop of a stitch of thread.

In one or any combination of these aspects, inserting the tool into the second opening includes inserting the tool into a notch in a first layer of the two layers of the article of clothing.

In one or any combination of these aspects, the method further includes disconnecting the tool from the end of the security tag.

In one or any combination of these aspects, the method further includes moving the end of the security tag back into the interface space.

In one or any combination of these aspects, the method further includes removing a portion of the end of the security tag extending from the second opening from the security tag.

In one or any combination of these aspects, connecting the end of the security tag to the tool includes releasably connecting the end of the security tag to the tool by passing the end of the security tag through an eyelet of the tool and folding the end of the security tag around the eyelet and the method further includes disconnecting the tool from the end of the security tag by unfolding the end of the security tag from the eyelet and passing the end of the security tag back out of the eyelet.

In one or any combination of these aspects, the tool includes a bodkin.

In one or any combination of these aspects, the end of the security tag includes a first end opposing a second end and the method further includes pushing the first end of the security tag through the first opening until the second end passes through the first opening.

In one or any combination of these aspects, the end of the security tag is attached to a string and the security tag is moved utilizing the string, yarn or cable.

In one or any combination of these aspects, the security tag includes at least one layer having a tensile strength greater than 425 cN.

In one or any combination of these aspects, the security tag has an elongated rectangular shape adapted for inserting the security tag into the interface space.

In one or any combination of these aspects, a plurality of electronic components of the security tag are positioned in a section of the security tag spaced apart from the end.

In one or any combination of these aspects, the security tag includes a coating layer covering an electronic article surveillance component of the security tag.

In one or any combination of these aspects, the coating layer comprises a plastic material layer, as described above, and such as but not limited to Oeko-tex 100 certified materials, nylon, TPU, polyesters and co-polyesters, polyamides, and/or any material that can hermetically seal the components of the security tag.

In one or any combination of these aspects, the first opening is defined in a notch formed on a first layer of the two layers of the article of clothing.

In one or any combination of these aspects, the first opening is between a loop in a stitch connecting the two layers of the article of clothing.

In one or any combination of these aspects, the interface space is defined by two spaced apart seams formed by two stitch lines.

In one or any combination of these aspects, the interface space is defined by an overlock stitch.

In an aspect, the present disclosure relates to an article of clothing, comprising at least two overlapping layers of material, wherein the two layers are fixedly connected by one or more opposing connectors that are spaced apart in a manner to form the interface space sized to receive the security tag, and a security tag having an end configured to be positioned into a first opening to the interface space between the two layers.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for securing a security tag into an article of clothing, comprising:

inserting a tool into a first opening to an interface space between two layers of the article of clothing, wherein the two layers are fixedly connected by one or more opposing connectors that are spaced apart in a manner to form the interface space sized to receive the security tag;

moving the tool to extend out of a second opening of the interface space;

connecting the security tag to the tool;

positioning an end of the security tag into the second opening; and moving the security tag fully into the interface space by moving the tool, with the security tag releasably connected thereto, back out of the first opening.

2. The method of claim 1, wherein inserting the tool into the first opening includes inserting the tool between a loop of a stitch of thread.

3. The method of claim 1, wherein inserting the tool into the first opening includes inserting the tool into a notch in a first layer of the two layers of the article of clothing.

4. The method of claim 1, further comprising:

disconnecting the tool from the end of the security tag.

5. The method of claim 4, further comprising:

moving the end of the security tag back into the interface space.

6. The method of claim 4, further comprising:

removing a portion of the end of the security tag extending from the first opening from the security tag.

7. The method of claim 1, further comprising:

wherein connecting the end of the security tag to the tool includes releasably connecting the end of the security tag to the tool by passing the end of the security tag through an eyelet of the tool and folding the end of the security tag around the eyelet; and wherein disconnecting the tool from the end of the security tag includes unfolding the end of the security tag from the eyelet and passing the end of the security tag back out of the eyelet.

8. The method of claim 1, wherein the tool comprises a bodkin.

9. The method of claim 1, wherein the end of the security tag comprises a first end opposing a second end, and further comprising:

pushing the first end of the security tag through the second opening until the second end passes through the second opening.

10. The method of claim 1, wherein the end of the security tag is attached to a string, yarn, or cable, and wherein the security tag is moved utilizing the string, yarn, or cable.

11. The method of claim 1, wherein the security tag includes at least one layer having a tensile strength greater than 425cN.

12. The method of claim 1, wherein the security tag has an elongated rectangular shape adapted for inserting the security tag into the interface space.

13. The method of claim 1, wherein a plurality of electronic components of the security tag are positioned in a section of the security tag spaced apart from the end.

14. The method of claim 1, wherein the security tag includes a coating layer covering an electronic article surveillance component of the security tag.

15. The method of claim 14, wherein the coating layer comprises a plastic material layer.

16. The method of claim 1, wherein the second opening is defined in a notch formed on a first layer of the two layers of the article of clothing.

17. The method of claim 1, wherein the second opening is between a loop in a stitch connecting the two layers of the article of clothing.

18. The method of claim 1, wherein the interface space is defined by two spaced apart seams formed by two stitch lines.

19. The method of claim 1, wherein the interface space is defined by an overlock stitch.

20. The method of claim 1, wherein the two layers are fixedly connected by at least one of: heat sealing with a heated tool or High Frequency (HF) welding.

21. A security tag configured to be secured to an article of clothing, the security tag comprising:

an elongated substrate;

an antenna mounted on the elongated substrate;

a radio frequency identification (RFID) circuit mounted to the antenna;

wherein a tool is configured to be inserted into a first opening to an interface space between two layers of the article of clothing, wherein the two layers are fixedly connected by one or more opposing connectors that are spaced apart in a manner to form the interface space sized to receive the security tag;

wherein the tool is configured to be moved to extend out of a second opening of the interface space;

wherein the security tag is configured to be connected to the tool;

wherein an end of the security tag is configured to be positioned into the second opening; and wherein the security tag is configured to be moved fully into the interface space by moving the tool, with the security tag releasably connected thereto, back out of the first opening.

22. The security tag of claim 21, further comprising a coating layer that covers the RFID circuit and the antenna.

23. The security tag of claim 22, wherein the coating layer comprises a plastic material layer.

24. The security tag of claim 21, further comprising:

a coupling adhesive layer, wherein the coupling adhesive layer couples the RFID circuit, the antenna and the elongated substrate.

25. The security tag of claim 23, wherein the security tag has a first end and a second end, wherein a first end of the antenna has a first spacing from the first end of the security tag and a second end of the antenna has a second spacing from the second end of the security tag, and wherein the second spacing is substantially greater than the first spacing.

26. The security tag of claim 25, wherein the coating layer covering a portion of the security tag extending from the second end of the antenna is thinner than the coating layer covering a remaining portion of the security tag.

27. The security tag of claim 25, wherein bending modulus of elasticity of the coating layer is greater than 2 GPa.

28. The security tag of claim 25, wherein thickness of the coating layer is greater than 50 um.

29. The security tag of claim 21, wherein the elongated substrate includes an end section spaced apart from the RFID circuit and the antenna, and wherein the end section has a tensile strength greater than 425 cN.

30. An article of clothing, comprising:

at least two overlapping layers of material, wherein the at least two overlapping layers are fixedly connected by one or more opposing connectors that are spaced apart in a manner to form an interface space sized to receive a security tag, wherein a tool is configured to be inserted into a first opening to the interface space, wherein the tool is configured to be moved to extend out of a second opening of the interface space; and the security tag configured to be connected to the tool, the security tag having an end configured to be positioned into the second opening, wherein the security tag is configured to be moved fully into the interface space by moving the tool, with the security tag releasably connected thereto, back out of the first opening.

* * * * *